(12) United States Patent
Atakan et al.

(10) Patent No.: US 11,718,566 B2
(45) Date of Patent: Aug. 8, 2023

(54) COMPOSITE MATERIALS AND BONDING ELEMENTS FROM CARBONATION OF CALCIUM SILICATE AND METHODS THEREOF

(71) Applicants: Solidia Technologies, Inc., Piscataway, NJ (US); LAFARGE, Paris (FR)

(72) Inventors: Vahit Atakan, West Windsor, NJ (US); Sadananda Sahu, Tallahassee, FL (US); Sean Quinn, North Plainfield, NJ (US); Nicholas DeCristofaro, Chatham, NJ (US); Vincent Meyer, Saint Quentin Fallavier (FR); Cédric Comparet, Saint Quentin Fallavier (FR); Günther Walenta, Saint Quentin Fallavier (FR)

(73) Assignee: solidia technologies, inc., San Antonio, TX (US)

( * ) Notice: Subject to any disclaimer, the term of this patent is extended or adjusted under 35 U.S.C. 154(b) by 139 days.

(21) Appl. No.: 15/074,692

(22) Filed: Mar. 18, 2016

(65) Prior Publication Data
US 2016/0272545 A1 Sep. 22, 2016

Related U.S. Application Data

(60) Provisional application No. 62/136,201, filed on Mar. 20, 2015, provisional application No. 62/136,208, filed on Mar. 20, 2015.

(51) Int. Cl.
*C04B 28/24* (2006.01)
*C04B 28/18* (2006.01)
(Continued)

(52) U.S. Cl.
CPC .............. *C04B 28/24* (2013.01); *C04B 7/345* (2013.01); *C04B 28/188* (2013.01); *C04B 35/22* (2013.01);
(Continued)

(58) Field of Classification Search
CPC ............................. C04B 28/188; C04B 35/22
See application file for complete search history.

(56) References Cited

U.S. PATENT DOCUMENTS

| 4,436,498 A | 3/1984 | Tabereaux et al. |
| 4,956,321 A | 9/1990 | Barrall |

(Continued)

FOREIGN PATENT DOCUMENTS

| CN | 102083771 A | 6/2011 |
| CN | 103502183 A | 1/2014 |

(Continued)

OTHER PUBLICATIONS

Goto et. al. J. Am. Ceram. Soc., 78, (11), 1995, 2867-2872.*

(Continued)

*Primary Examiner* — Mark Ruthkosky
*Assistant Examiner* — Julia L Rummel
(74) *Attorney, Agent, or Firm* — Dentons US LLP

(57) ABSTRACT

The invention provides composite materials comprising novel bonding elements exhibiting unique microstructures and chemical compositions, and methods for their manufacture and uses, for example, in a variety of concrete components with or without aggregates in the infrastructure, construction, pavement and landscaping industries.

11 Claims, 19 Drawing Sheets

(51) Int. Cl.
    *C04B 35/22* (2006.01)
    *C04B 7/345* (2006.01)
    *C04B 40/02* (2006.01)
    *C04B 35/64* (2006.01)

(52) U.S. Cl.
    CPC .......... *C04B 35/64* (2013.01); *C04B 40/0231* (2013.01); *C04B 2235/3206* (2013.01); *C04B 2235/3217* (2013.01); *C04B 2235/3272* (2013.01); *C04B 2235/349* (2013.01); *C04B 2235/3418* (2013.01); *C04B 2235/5436* (2013.01); *C04B 2235/80* (2013.01); *Y02P 40/10* (2015.11); *Y02P 40/18* (2015.11); *Y02W 30/91* (2015.05)

(56) References Cited

U.S. PATENT DOCUMENTS

| | | |
|---|---|---|
| 8,114,367 B2 | 2/2012 | Riman et al. |
| 2005/0284339 A1 | 12/2005 | Brunton et al. |
| 2007/0062416 A1 | 3/2007 | Brzuskiewicz et al. |
| 2009/0133361 A1 | 5/2009 | Vera |
| 2009/0142578 A1 | 6/2009 | Riman et al. |
| 2009/0143211 A1 | 6/2009 | Riman et al. |
| 2010/0077691 A1 | 4/2010 | Constantz et al. |
| 2010/0326328 A1 | 12/2010 | Constantz et al. |
| 2011/0067600 A1 | 3/2011 | Constantz et al. |
| 2011/0067605 A1 | 3/2011 | Constantz et al. |
| 2011/0104469 A1 | 5/2011 | Riman et al. |
| 2011/0129407 A1 | 6/2011 | Riman et al. |
| 2011/0165400 A1* | 7/2011 | Quaghebeur ........ C04B 40/0231 428/220 |
| 2011/0182799 A1 | 7/2011 | Riman et al. |
| 2011/0203489 A1 | 8/2011 | Constantz et al. |
| 2011/0290156 A1 | 12/2011 | Constantz et al. |
| 2012/0312194 A1 | 12/2012 | Riman et al. |
| 2013/0122267 A1 | 5/2013 | Riman et al. |
| 2014/0127450 A1 | 5/2014 | Riman et al. |
| 2014/0127458 A1 | 5/2014 | Riman et al. |
| 2014/0263683 A1 | 9/2014 | Krishnan et al. |
| 2014/0272216 A1 | 9/2014 | Deo et al. |
| 2014/0314990 A1 | 10/2014 | Henn et al. |
| 2014/0322083 A1 | 10/2014 | Kuppler et al. |
| 2014/0342124 A1 | 11/2014 | Zambrzycki et al. |
| 2014/0361471 A1 | 12/2014 | Hu et al. |
| 2014/0363665 A1 | 12/2014 | Kuppler et al. |
| 2015/0056437 A1 | 2/2015 | Deo et al. |
| 2015/0225295 A1 | 8/2015 | McCandlish et al. |
| 2015/0266778 A1 | 9/2015 | Riman et al. |
| 2015/0336852 A1 | 11/2015 | Patten et al. |
| 2016/0031757 A1 | 2/2016 | Atakan et al. |
| 2016/0096773 A1 | 4/2016 | Quinn et al. |
| 2016/0168720 A1 | 6/2016 | Jain et al. |

FOREIGN PATENT DOCUMENTS

| | | |
|---|---|---|
| JP | 2001-278679 A | 10/2001 |
| WO | 2009/103885 A2 | 8/2009 |
| WO | 2009/132692 A1 | 11/2009 |
| WO | 2009/102360 A2 | 1/2010 |
| WO | 2011/053598 A2 | 5/2011 |
| WO | 2011/090967 A2 | 7/2011 |
| WO | 2012/122031 A2 | 9/2012 |
| WO | 2014/159832 A2 | 10/2014 |
| WO | 2014/160168 A2 | 10/2014 |
| WO | 2014/165252 A2 | 10/2014 |
| WO | 2014/165257 A2 | 10/2014 |
| WO | 2014/197532 A2 | 12/2014 |
| WO | 2014/197545 A2 | 12/2014 |
| WO | 2015/026900 A2 | 2/2015 |
| WO | 2015/051243 A2 | 4/2015 |
| WO | 2015090533 A1 | 6/2015 |
| WO | 2015/103107 A2 | 7/2015 |
| WO | 2015/112655 A2 | 7/2015 |
| WO | 2016/022485 A2 | 2/2016 |
| WO | 2016/022522 A2 | 2/2016 |
| WO | 2016/054602 A2 | 4/2016 |

OTHER PUBLICATIONS

English language translation of WO 2015/090533 A1, generated on Oct. 3, 2022 with Espacenet website (https://www.epo.org/searching-for-patents/technical/espacenet.html) (Year: 2013).*
PCT/US2014/024987, Int'l Search Report of ISA, dated Aug. 14, 2014.
PCT/US2014/025278, Int'l Search Report of ISA, dated Aug. 14, 2014.
PCT/US2014/024996, Int'l Search Report of ISA, dated Aug. 21, 2014.
PCT/US2014/025958, Int'l Search Report of ISA, dated Sep. 4, 2014.
PCT/US2014/040816, Int'l Search Report of ISA, dated Oct. 30, 2014.
PCT/US2014/040789, Int'l Search Report of ISA, dated Sep. 30, 2014.
PCT/US2014/059024, Int'l Search Report of ISA, dated Apr. 2, 2015.
PCT/US2014/072494, Int' Search Report and Written Opinion of ISA, dated Jun. 4, 2015.
PCT/US2015/043452, Int' Search Report and Written Opinion of ISA, dated Dec. 17, 2015.
PCT/US2015/043540, Int' Search Report and Written Opinion of ISA, dated Jan. 27, 2016.
PCT/US2016/023181, Int' Search Report and Written Opinion of ISA, dated Jun. 13, 2016.
PCT/US2015/053879, Int' Search Report and Written Opinion of ISA, dated Jan. 28, 2016.
PCT/US2016/023193, Int' Search Report and Written Opinion of ISA, dated Jun. 13, 2016.
Daval, et al.: "Mechanism of wollastonite carbonation deduced from micro- to nanometer length scale observations", XP055126736, American Mineralogist, vol. 94, No. 11-12, Nov. 1, 2009, pp. 1707-1726.

* cited by examiner

Reactive Phase   Silica or inert phase   Calcium Carbonate (CaCO₃)

Side View

Cross section

Side View

Cross section

COMPOSITE MATERIALS AND BONDING ELEMENTS FROM CARBONATION OF CALCIUM SILICATE AND METHODS THEREOF

PRIORITY CLAIMS AND RELATED PATENT APPLICATIONS

This application claims the benefit of priority from U.S. Provisional Application Ser. Nos. 62/136,201 and 62/136,208, both filed on Mar. 20, 2015, the entire content of each of which is incorporated herein by reference in its entirety.

FIELD OF THE INVENTION

The invention generally relates to calcium silicate compositions. More particularly, the invention relates to composite materials comprising novel bonding elements exhibiting unique microstructures and chemical compositions, and methods for their manufacture and uses, for example, in a variety of concrete components in the infrastructure, construction, pavement and landscaping industries.

BACKGROUND OF THE INVENTION

Concrete is the most consumed man-made material in the world. A typical concrete is made by mixing Portland cement, water and aggregates such as sand and crushed stone. Portland cement is a synthetic material made by burning a mixture of ground limestone and clay, or materials of similar composition in a rotary kiln at a sintering temperature of 1450° C. Portland cement manufacturing is not only an energy-intensive process, but one which releases considerable quantities of greenhouse gas ($CO_2$). The cement industry accounts for approximately 5% of global anthropogenic $CO_2$ emissions. More than 60% of this $CO_2$ comes from the chemical decomposition, or calcination of limestone.

There has been growing effort to reduce total $CO_2$ emissions within the cement industry. According to a proposal by the International Energy Agency, the cement industry needs to reduce its $CO_2$ emissions from 2.0 Gt in 2007 to 1.55 Gt by 2050. This represents a daunting task because, over this same period, cement production is projected to grow from 2.6 Gt to 4.4 Gt.

To meet this formidable challenge, a revolutionary approach to cement production was recently developed that significantly reduces the energy requirement and $CO_2$ emissions of a cement plant. The unique cement is comprised of carbonatable calcium silicate compositions and is made from widely available, low cost raw materials and offers the ability to permanently and safely sequester $CO_2$ while being adaptable and flexible in equipment and production requirements, allowing manufacturers of conventional cement to easily convert to the new platform.

To improve the bonding strength and production efficiency as well as reducing operation cost and carbon footprint, efforts are needed to develop novel bonding microstructures and composite materials that match or exceed the physical and performance characteristics of existing concrete materials.

SUMMARY OF THE INVENTION

The invention provides novel composite materials and bonding elements exhibiting unique microstructures and chemical compositions, and methods for their manufacture and uses, for example, in a variety of concrete components in the infrastructure, construction, pavement and landscaping industries. The disclosed composite materials and bonding elements are produced by carbonation of suitable calcium silicate materials (e.g., clinker and cement), which can be made from widely available, low cost raw materials via a process suitable for large-scale production. The method of the invention is flexible in equipment and processing requirements and is readily adaptable to manufacturing facilities of conventional Portland cement. The herein disclosed novel composite materials and bonding elements found therein can be used in a variety of concrete applications such as in construction, pavements and landscaping, and infrastructure with reduced equipment need, improved energy consumption, and more desirable carbon footprint.

In one aspect, the invention generally relates to a composite material produced by carbonation of calcium silicate with $CO_2$. The composite material comprises a plurality of bonding elements of one or more types (microstructures). These types of bonding elements include: a bonding element comprising a core of an unreacted carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich rim of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich rim of varying thickness that is fully or partially encased by $CaCO_3$ particles; a bonding element comprising particles of partially reacted calcium silicate without a distinct core and silica rim encased by $CaCO_3$ particles; and a bonding element comprising porous particles without a distinct silica rim encased by $CaCO_3$ particles. Collectively, the plurality of bonding elements forms an inter-connected bonding matrix creating bonding strength and holding the composite material.

In another aspect, the invention generally relates to a bonding matrix comprising a plurality of bonding elements. The bonding elements are selected from: a bonding element comprising a core of an unreacted carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich rim of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich rim of varying thickness that is fully or partially encased by $CaCO_3$ particles; a bonding element comprising particles of partially reacted calcium silicate without a distinct core and silica rim encased by $CaCO_3$ particles; and a bonding element comprising porous particles without a distinct silica rim encased by $CaCO_3$ particles.

In yet another aspect, the invention generally relates to a method for producing the composite material comprising the disclosed bonding elements.

BRIEF DESCRIPTION OF THE DRAWINGS

The objects and features of the invention can be better understood with reference to the drawings described below and the claims. The drawings are not necessarily to scale, emphasis instead generally being placed upon illustrating the principles of the invention. In the drawings, like numerals are used to indicate like parts throughout the various views.

In FIG. 1(a), (1) Single phase reactive or partially reactive; (2) Core particle with a varied silica rich rim fully encased by $CaCO_3$; (3) Core particle with a varied silica rich rim partially encased by $CaCO_3$ particles; (4) Core particle with a silica rich rim fully encased by $CaCO_3$; (5) Core particle with a partial silica rich rim where the rim is fully encased by $CaCO_3$; (6) Core particle with a partial silica rich rim where the rim is partially encased by $CaCO_3$; (7) Fully reacted core particle partially encased by $CaCO_3$. In FIG. 1(b), (1) Inert particle; (2) Inert core fully encased by $CaCO_3$; (3) Inert core partially encased by $CaCO_3$ particles. In FIG. 1(c), (1) Multi-phase particle with phase A and phase B; (2) Core particle where phase A and phase B have reacted. The core particle is fully covered a silica rich rim of variable thickness and is fully encased by $CaCO_3$; (3) Core particle where phase B has reacted and phase A has not reacted. Phase B is covered by a silica rich rim and the silica rim rim is encased by $CaCO_3$; (4) Core particle where phase B has reacted and phase A has not reacted. Phase B is covered by a silica rich rim and the entire core particle is encased by $CaCO_3$; (5) A core particle where phase A has reacted and phase B has not reacted. Phase A is covered by a silica rich rim and the the silica rim rim is encased by $CaCO_3$; (6) A core particle where phase A has reacted and phase B has not reacted. Phase A is covered by a silica rich rim and the entire core particle is incased by $CaCO_3$. In FIG. 1(d), (1) Multi-phase core with inert phase A and inert phase B; (2) Inert core fully encased by $CaCO_3$; (3) Inert core partially encased by $CaCO_3$ particles. In FIG. 1(e), (1) Multi-phase particle with multiple reactive and inert phases; (2) Multi-phase particle with multiple reactive and inert phases; (3) One reactive phase reacted and covered by a varied silica rich rim fully encased by $CaCO_3$ particles; (4) Two reactive phases reacted and covered by a varied silica rich rim fully encased by $CaCO_3$ particles. In FIG. 1(f), (1) Reactive particle with voids (regularly or irregularly shaped); (2) Core particle reacted and covered by a varied silica rich rim where the silica rich rim is encased by $CaCO_3$.

DETAILED DESCRIPTION OF THE INVENTION

Figure 1A:
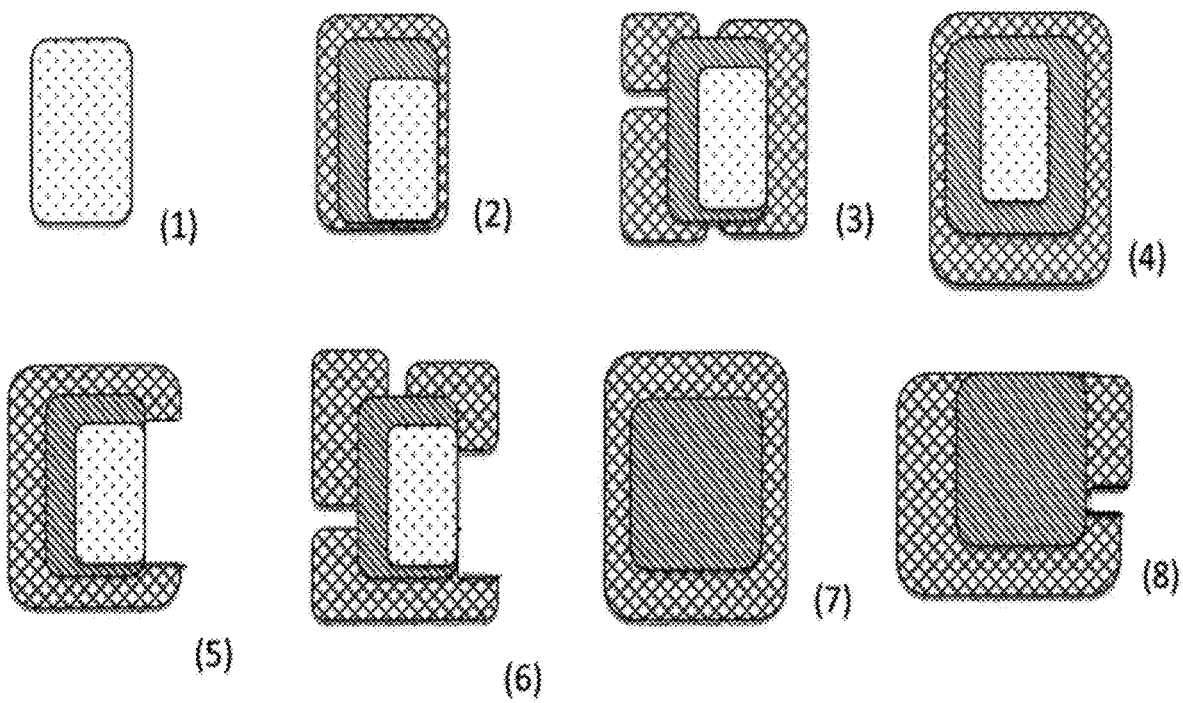
FIGS. 1(a)-1(f) are schematic illustrations of exemplary bonding elements according to exemplary embodiments of the present invention.

The invention provides novel composite materials and bonding elements exhibiting unique microstructures, chemical compositions and bonding strength, as well as methods for their manufacture and uses, for example, in a variety of concrete products and components in the infrastructure, construction, pavement and landscaping industries. The disclosed composite materials and bonding elements are produced by carbonation of suitable calcium silicate materials (e.g., clinker and cement based on calcium silicate), which can be made from widely available, low cost raw materials via a process suitable for large-scale production. The method of the invention is flexible in equipment and processing requirements and is readily adaptable at manufacturing facilities of conventional Portland cement.

The composite materials can be produced with significantly reduced energy requirement and $CO_2$ emissions and can be utilized in a variety of concrete applications. The raw materials include precursor materials such as particulate calcium silicate (e.g., ground wollastonite) that form bonding elements. A fluid component is also provided as a reaction medium, comprising liquid water and/or water vapor. Carbon dioxide ($CO_2$) is consumed as a reactive species in the carbonation process, resulting in net sequestration of $CO_2$. Various additives can be used to fine-tune the physical appearance and mechanical properties of the resulting composite material.

Bonding Elements and Composite Materials

In one aspect, the invention generally relates to a composite material produced by carbonation of calcium silicate with $CO_2$. The composite material comprises a plurality of bonding elements of one or more types of microstructure, selected from: a bonding element comprising a core of an unreacted carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich rim of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich rim of varying thickness that is fully or partially encased by $CaCO_3$ particles; a bonding element comprising particles of partially reacted calcium silicate without a distinct core and silica rim encased by $CaCO_3$ particles; and a bonding element comprising porous particles without a distinct silica rim encased by $CaCO_3$ particles. Collectively, the plurality of bonding elements form an inter-connected bonding matrix creating bonding strength and holding the composite material.

In another aspect, the invention generally relates to a bonding matrix comprising a plurality of bonding elements. The bonding elements are selected from: a bonding element comprising a core of an unreacted carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich rim of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich rim of varying thickness that is fully or partially encased by $CaCO_3$ particles; a bonding element comprising particles of partially reacted calcium silicate without a distinct core and silica rim encased by $CaCO_3$ particles; and a bonding element comprising porous particles without a distinct silica rim encased by $CaCO_3$ particles.

The silica rich rim generally displays a varying thickness within a bonding element and from bonding element to bonding element, typically ranging from about 0.01 µm to about 50 µm. In certain preferred embodiments, the silica rich rim has a thickness ranging from about 1 µm to about 25 µm. As used herein, "silica rich" generally refers to a silica content that is significant among the components of a material, for example, silica being greater than about 50% by volume. The remainder of the silica rich rim is comprised largely of $CaCO_3$, for example 10% to about 50% of $CaCO_3$ by volume. The silica rich rim may also include inert or unreacted particles, for example 10% to about 50% of melilite by volume. A silica rich rim generally displays a transition from being primarily silica to being primarily $CaCO_3$. The silica and $CaCO_3$ may be present as intermixed or discrete areas.

"Carbonatable", as used herein, refers to a material that is reactive with $CO_2$ via a carbonation reaction under a condition disclosed herein. A material is "uncarbonatable" if it is unreactive with $CO_2$ via a carbonation reaction under a condition disclosed herein. The terms "reactive phase" and "carbonatable phase" are used interchangeably to refer to a material phase that is carbonatable as defined herein. The terms "inert phase" and "uncarbonatable phase" are used interchangeably to refer to a material phase that is uncarbonatable as defined herein. Exemplary carbonatable or reactive phases include CS (wollastonite or pseudowollastonite, and sometimes formulated $CaSiO_3$ or $CaO \cdot SiO_2$), C3S2 (rankinite, and sometimes formulated as $Ca_3Si_2O_7$ or $3CaO \cdot 2SiO_2$), C2S (belite, $\beta$-$Ca_2SiO_4$ or larnite, $Ca_7Mg(SiO_4)_4$ or bredigite, $\alpha$-$Ca_2SiO_4$ or $\gamma$-$Ca_2SiO_4$, and sometimes formulated as $Ca_2SiO_4$ or $2CaO \cdot SiO_2$). Amorphous phases can also be carbonatable depending on their composition. Exemplary uncarbonatable or inert phases include melilite ($(Ca,Na,K)_2[(Mg, Fe^{2+},Fe^{3+},Al, Si)_3O_7]$) and crystalline silica ($SiO_2$).

The silica rich rim is also characterized by a varying silica content from bonding element to bonding element, typically ranging from about 50% to about 90% by volume (e.g., from about 60% to about 80%). In certain embodiments, the silica rich rim is generally characterized by a silica content ranging from about 50% to about 90% by volume and a $CaCO_3$ content ranging from about 10% to about 50% by volume. In certain embodiments, the silica rich rim is characterized by a silica content ranging from about 70% to about 90% by volume and a $CaCO_3$ content ranging from about 10% to about 30% by volume. In certain embodiments, the silica rich rim is characterized by a silica content ranging from about 50% to about 70% by volume and a $CaCO_3$ content ranging from about 30% to about 50% by volume.

The silica rich rim may surround the core to various degrees of coverage anywhere from about 1% to about 99% (e.g., about 10% to about 90%). In certain embodiments, the silica rich rim surrounds the core with a degree of coverage less than about 10%. In certain embodiments, the silica rich rim of varying thickness surrounds the core with a degree of coverage greater than about 90%.

The plurality of bonding elements may have any suitable mean particle size and size distribution dependent on the desired properties and performance characteristics of the composite product. In certain embodiments, for example, the plurality of bonding elements have a mean particle size in the range of about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

Cement particles of certain microstructures may be more suited to generate the bonding matrix disclosed here. Generally, cement particles may be categorized into two groups: single phase particles and multi-phase particles.

Single phase particles may exist in various forms, including: (i) reactive (carbonatable) wollastonite ($CaSiO_3$), rankinite ($Ca_3Si_2O_7$) and C2S ($Ca_2SiO_4$); (ii) partially reactive amorphous phases of variable compositions; and (iii) inert (unconbanatable) phases such as melilite ($(Ca,Na,K)_2[(Mg, Fe^{2+},Fe^{3+},Al, Si)_3O_7]$) and crystalline silica ($SiO_2$).

Multi-phase particles may exist in various forms, including: (i) "reactive-reactive", i.e., a combination of two or more reactive phases (e.g., $CaSiO_3$, $Ca_3Si_2O_7$, $Ca_2SiO_3$); (ii) "reactive-inert", i.e., a combination of at least one reactive phase (e.g., $CaSiO_3$, $Ca_3Si_2O_7$, $Ca_2SiO_3$) with at least one inert phase (e.g., $(Ca,Na,K)_2[(Mg, Fe^{2+},Fe^{3+},Al, Si)_3O_7]$, $SiO_2$); (iii) "inert-inert", i.e., a combination of two or more inert phases (e.g., $(Ca,Na,K)_2[(Mg, Fe^{2+},Fe^{3+},Al,Si)_3O_7]$, $SiO_2$); (iv) "reactive-partially reactive", i.e., a combination of at least one reactive phase (e.g., $CaSiO_3$, $Ca_3Si_2O_7$, $Ca_2SiO_3$) with a partially reactive amorphous phase; (v) "inert—partially reactive", i.e., a combination of at least one inert phase (e.g., $(Ca,Na,K)_2[(Mg, Fe^{2+},Fe^{3+},Al, Si)_3O_7]$, $SiO_2$) with a partially reactive amorphous phase; (vi) "reactive-slightly reactive-inert", i.e., a combination of at least one reactive phase (e.g., $CaSiO_3$, $Ca_3Si_2O_7$, $Ca_2SiO_3$) with at least one inert phase (e.g., $(Ca,Na,K)_2[(Mg, Fe^{2+},Fe^{3+},Al, Si)_3O_7]$, $SiO_2$) and a partially reactive amorphous phase; and (vii) void-containing particles, wherein a particle from one of the categories above which is not fully dense and has internal or surface connected voids.

Figure 1B:
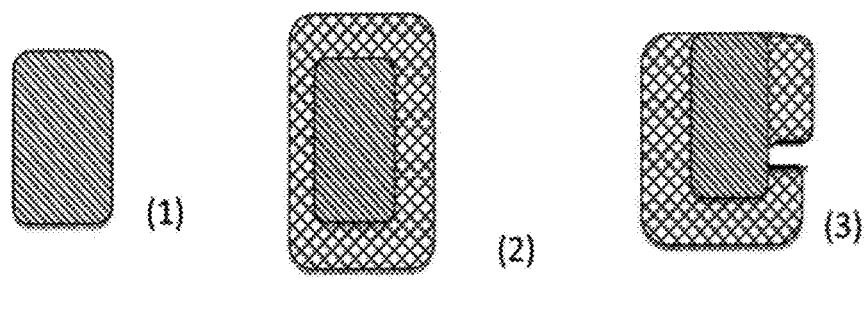
Figure 1C:
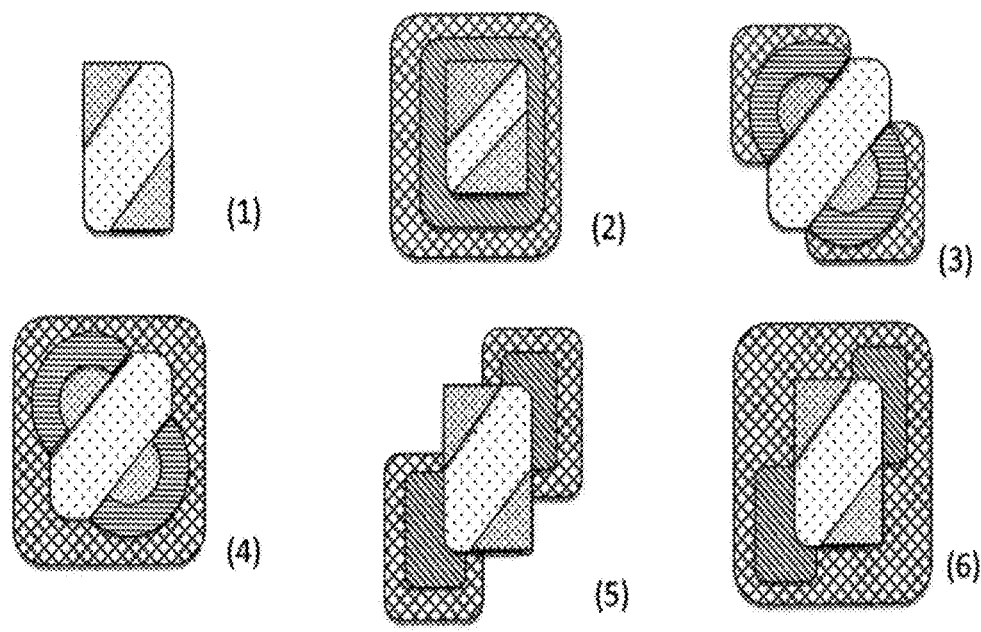
Figure 1D:
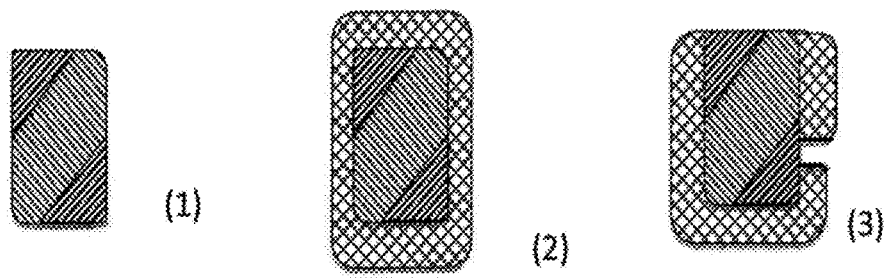
Figure 1E:
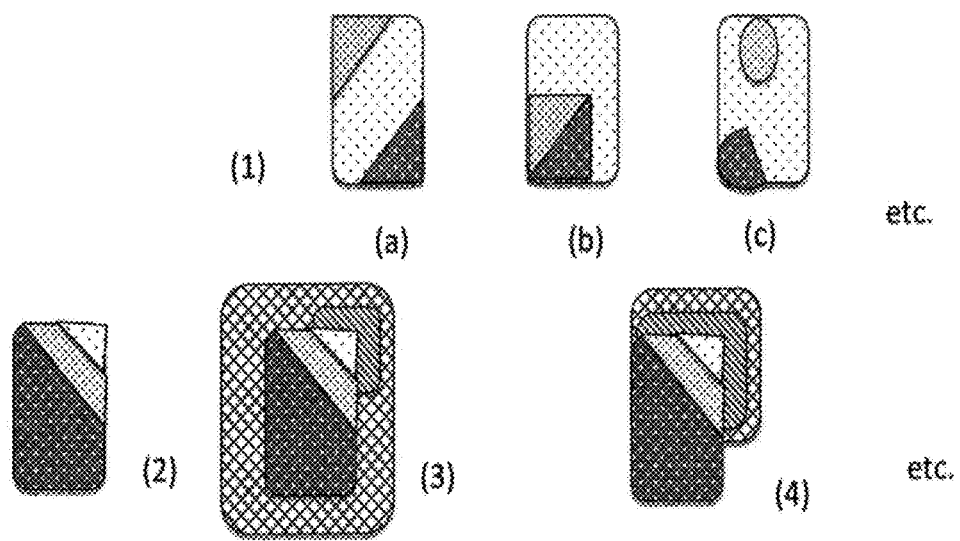
Figure 1E:
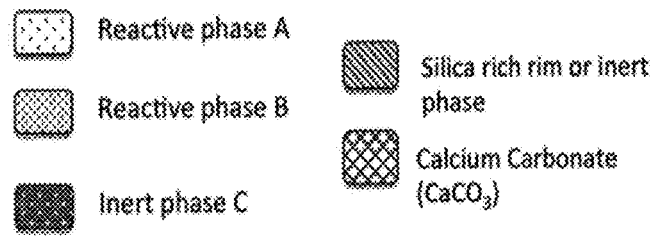
Figure 1F:
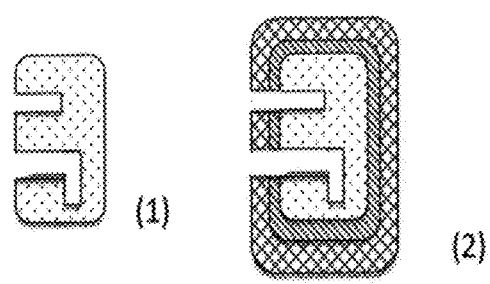
Figure 1F:
Figure 1F:
Figure 1F:

FIGS. 1(a)-1(f) are schematic illustrations of exemplary bonding elements according to exemplary embodiments of the present invention. FIG. 1(a) depicts a single-phase reactive particle (1) and various exemplary bonding elements that may result therefrom. In (5), for example, is depicted a microstructure wherein the encasing $CaCO_3$ exists only adjacent to a silica rim formed by reaction of calcium silicate). FIG. 1(b) depicts a single-phase inert particle (1) and various exemplary bonding elements that may result therefrom. FIG. 1(c) depicts a two-phase reactive particle (1) and various exemplary bonding elements that may result therefrom. FIG. 1(d) depicts a two-phase inert particle (1) and various exemplary bonding elements that may result therefrom. FIG. 1(e) depicts a multi-phase reactive particle (1)(a), (1)(b), (1)(c), etc. and various exemplary bonding elements that may result from a multi-phase reactive particle (2). FIG. 1(f) depicts a single-phase reactive particle with voids and exemplary bonding elements that may result. It is noted that these bonding elements are exemplary and drawn for illustrative purposes and are not representative of actual or relative shapes or dimensions.

A bonding element may exhibit any size and any regular or irregular, solid or hollow morphology, which may be favored one way or another by raw materials selection and the production process in view of the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In certain embodiments, a bonding element or a bonding matrix may have one or more voids. Voids may be present in single-phase or multi-phase cores or in bonding elements without distinctive cores. Voids may be present in reactive phases or inert phases. Voids may also be present in the encasing $CaCO_3$. Thus, voids may be present inside a bonding element or spatially disposed between bonding elements. Voids may be internal or surface, isolated or inter-connected voids.

Figure 2A:
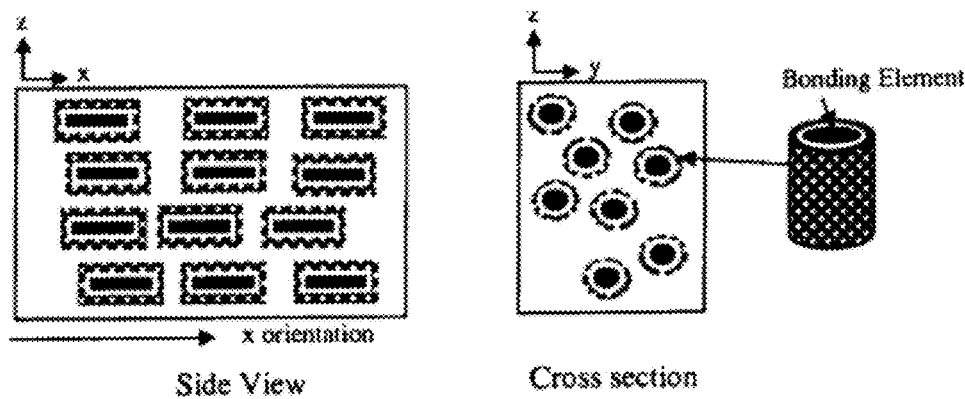
FIGS. 2(a)-2(f) are schematic illustrations of side view and cross section views of composite materials according to exemplary embodiments of the present invention, illustrating FIG. 2(a) 1D oriented fiber-shaped bonding elements in a dilute bonding matrix (bonding elements are not touching), FIG. 2(b) 2D oriented platelet shaped bonding elements in a dilute bonding matrix (bonding elements are not touching), FIG. 2(c) 3D oriented platelet shaped bonding elements in a dilute bonding matrix (bonding elements are not touching), and FIG. 2(d) randomly oriented platelet shaped bonding elements in a dilute bonding matrix (bonding elements are not touching), wherein the composite materials includes the bonding matrix and filler components such as polymers, metals, inorganic particles, aggregates etc., FIG. 2(e) a concentrated bonding matrix (with a volume fraction sufficient to establish a percolation network) of bonding elements where the matrix is 3D oriented, and FIG. 2(f) a concentrated bonding matrix (with a volume fraction sufficient to establish a percolation network) of randomly oriented bonding elements, wherein filler components such as polymers, metals, inorganic particles, aggregates etc. may be included.
Figure 2B:
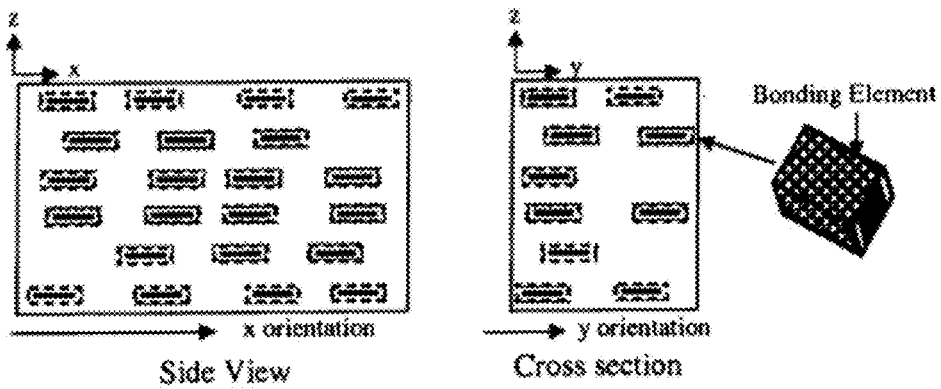
Figure 2C:
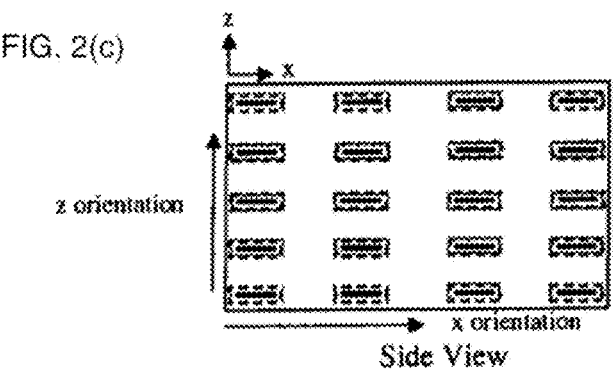
Figure 2C:
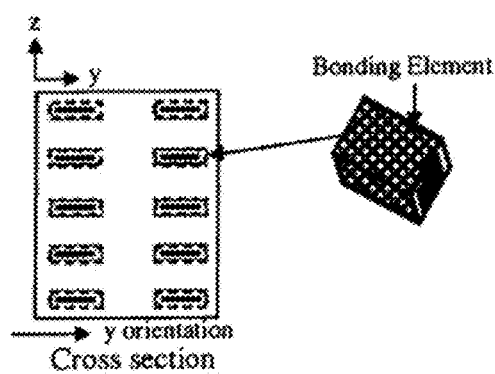
Figure 2D:
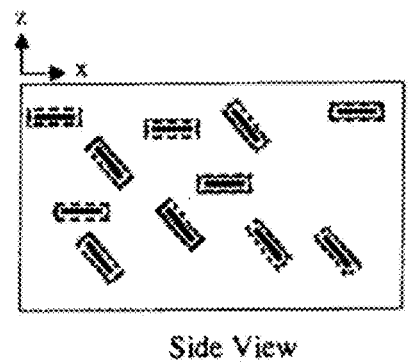
Figure 2D:
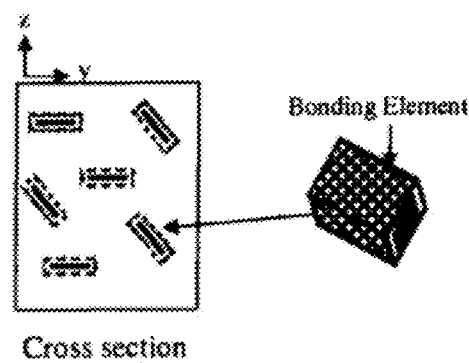
Figure 2E:
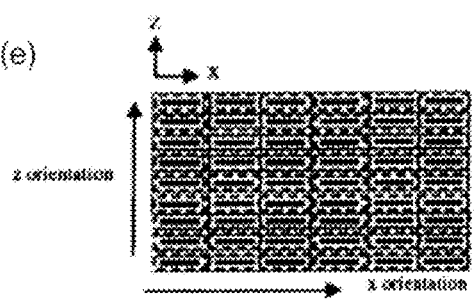
Figure 2E:
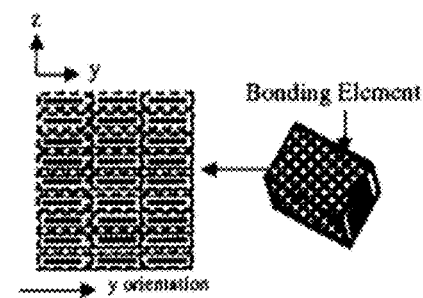
Figure 2F:
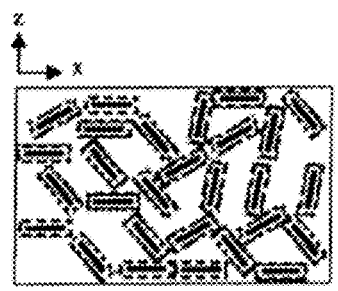
Figure 2F:
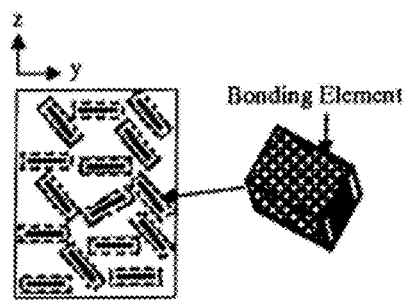

Within the bonding matrix, the bonding elements may be positioned, relative to each other, in any one of a number of orientations. FIGS. 2(a)-2(f) schematically illustrate an exemplary bonding matrix that includes fiber- or platelet-shaped bonding elements in different orientations possibly diluted by the incorporation of filler material, as represented by the spacing between the bonding elements. FIG. 2(a), for example, illustrates a bonding matrix that includes fiber-shaped bonding elements aligned in a one-direction ("1-D") orientation (e.g., aligned with respect to the x direction). FIG. 2(b) illustrates a bonding matrix that includes platelet-shaped bonding elements aligned in a two-direction ("2-D") orientation (e.g., aligned with respect to the x and y directions). FIG. 2(c) illustrates a bonding matrix that includes platelet-shaped bonding elements aligned in a three-direction ("3-D") orientation (e.g., aligned with respect to the x, y and z directions). FIG. 2(d) illustrates a bonding matrix that includes platelet-shaped bonding elements in a random orientation, wherein the bonding elements are not aligned with respect to any particular direction. FIG. 2(e) illustrates a bonding matrix that includes a relatively high concentration of platelet-shaped bonding elements that are aligned in a 3-D orientation. FIG. 2(f) illustrates a bonding matrix that includes a relatively low concentration of platelet-shaped bonding elements that are situated in a random orientation (a percolation network). The composite material of FIG. 2(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 2(e), or random orientation, e.g., FIG. 2(f), of bonding elements. Examples of connectivity patterns can be found in, for example, Newnham, et al., "Connectivity and piezoelectric-pyroelectric composites", Mat. Res. Bull. Vol. 13, pp. 525-536, 1978).

The bonding matrix may also include a plurality of coarse or fine filler particles that may be of any suitable material, have any suitable particle size and size distribution. In certain preferred embodiments, for example, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, fly ash, calcium carbonate-rich material and magnesium carbonate-rich material.

In certain embodiments, the plurality of filler particles has a mean particle size in the range from about 5 µm to about 7 mm (e.g., about 5 µm to about 5 mm, about 5 µm to about 4 mm, about 5 µm to about 3 mm, about 5 µm to about 2 mm, about 5 µm to about 1 mm, about 5 µm to about 500 µm, about 5 µm to about 300 µm, about 20 µm to about 5 mm, about 20 µm to about 4 mm, about 20 µm to about 3 mm, about 20 µm to about 2 mm, about 20 µm to about 1 mm, about 20 µm to about 500 µm, about 20 µm to about 300 µm, about 100 µm to about 5 mm, about 100 µm to about 4 mm, about 100 µm to about 3 mm, about 100 µm to about 2 mm, about 100 µm to about 1 mm).

The weight ratio of bonding elements to filler particles may be any suitable ratios dependent on the intended application for the composite material product. For example, the weight ratio of bonding elements to filler particles may be in the range from about (50 to 99): about (1 to 50), e.g., from about (60 to 99): about (1 to 40), from about (80 to 99): about (1 to 20), from about (90 to 99): about (1 to 10), from about (50 to 90): about (10 to 50), from about (50 to 70): about (30 to 50). In certain embodiments depending on the application, the weight ratio of bonding elements to filler particles may be in the range from about (10 to 50): about (50 to 90), e.g., from about (30 to 50): about (50 to 70), from about (40 to 50): about (50 to 60).

Depending on materials and conditions used to produce a composite material, one or more types of the bonding elements may be more prevailing than other types in the bonding matrix of the composite material. For example, the clinker or cement production process and raw materials used therefor may generate clinker or cement microstructures that impact carbonation and the resulting composite material. Additionally, clinker grinding can also impact grain size and distribution and the overall microscopic morphology of cement, which can in turn affect the microstructures of the bonding elements within the composite material upon carbonation.

A further factor that impacts bonding matrix formation is the reactivity profile of the cement to be carbonated. For example, a cement may be characterized by an overall surface area at least 10% of which is covered with a carbonatable phase. In certain embodiments, a cement may be characterized by an overall surface area at least 20% of which is covered with a carbonatable phase. In certain embodiments, a cement may be characterized by an overall surface area at least 30% of which is covered with a carbonatable phase. In certain embodiments, cement may be characterized by an overall surface area at least 40% of which is covered with a carbonatable phase. In certain embodiments, cement may be characterized by an overall surface area at least 50% of which is covered with a carbonatable phase. In certain embodiments, cement may be characterized by an overall surface area at least 60% of which is covered with a carbonatable phase. In certain embodiments, cement may be characterized by an overall surface area at least 70% of which is covered with a carbonatable phase. In certain embodiments, for example, cement may be characterized by an overall surface area at least 80% of which is covered with a carbonatable phase. In certain embodiments, cement may be characterized by an overall surface area at least 90% of which is covered with a carbonatable phase. In certain embodiments, cement may be characterized by an overall surface area at least 95% of which is covered with a carbonatable phase. In certain embodiments, the powdery material is characterized by an overall surface area substantially fully covered with a carbonatable phase.

"Calcium silicate" or "calcium silicate composition", as used herein, generally refer to naturally-occurring minerals or synthetic materials that are comprised of one or more of a group of calcium silicate phases including CS (wollastonite or pseudowollastonite, and sometimes formulated $CaSiO_3$ or $CaO \cdot SiO_2$), C3S2 (rankinite, and sometimes formulated as $Ca_3Si_2O_7$ or $3CaO \cdot 2SiO_2$), C2S (belite, $\beta\text{-}Ca_2SiO_4$ or larnite, $Ca_7Mg(SiO_4)_4$ or bredigite, $\alpha\text{-}Ca_2SiO_4$ or $\gamma\text{-}Ca_2SiO_4$, and sometimes formulated as $Ca_2SiO_4$ or $2CaO \cdot SiO_2$), a calcium-silicate based amorphous phase, each of which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

Carbonation and Curing Process Control

This invention additionally provides methods for manufacturing novel composite materials that are cured predominantly by a $CO_2$ consumption reaction. In addition to $CO_2$, another process component is water. In preferred embodiments of the invention, $CO_2$ is used as a reactive species resulting in sequestration of $CO_2$ and the creation of bonding elements in the produced composite materials. The carbonation, for example, may be carried out with $CO_2$ and water via a controlled Hydrothermal Liquid Phase Sintering (HLPS) process to create bonding strength that hold together the various components of the composite material. Discussions of various features of HLPS can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub.

No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. patent application Ser. Nos. 14/045,758, 14/045,519, 14/045,766, 14045540, all filed Oct. 3, 2013, U.S. patent application Ser. Nos. 14/207,413, 14/207,421, filed Mar. 12, 2014, U.S. patent application Ser. Nos. 14/207,920, 14/209,238, filed Mar. 13, 2014, U.S. patent application Ser. Nos. 14/295,601, 14/295,402, filed Jun. 4, 2014, each of which is expressly incorporated herein by reference in its entirety for all purposes.

The following reactions are believed to take place during carbonation of calcium silicate as disclosed herein.

$$CaSiO_3(s)+CO_2(g) \rightarrow CaCO_3(s)+SiO_2(s) \quad (1)$$

$$Ca_3Si_2O_7(s)+3CO_2(g) \rightarrow 3CaCO_3(s)+2SiO_2(s) \quad (2)$$

$$Ca_2SiO_4(s)+2CO_2(g) \rightarrow 2CaCO_3(s)+SiO_2(s) \quad (3)$$

Generally, $CO_2$ is introduced as a gas phase that dissolves into an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from the calcium silicate phases. Calcium may be leached from calcium containing amorphous phases through a similar mechanism. The released calcium cations and the dissociated carbonate species lead to the precipitation of insoluble carbonates. Silica-rich layers are thought to remain on the mineral particles as calcium depleted layers.

The $CaCO_3$ produced from these or any other $CO_2$ carbonation reactions disclosed herein may exist as one or more of several $CaCO_3$ polymorphs (e.g., calcite, aragonite, and vaterite). The $CaCO_3$ particles are preferably in the form of calcite but may also be present as aragonite or vaterite or as a combination of two or three of the polymorphs (e.g., calcite/aragonite, calcite/vaterite, aragonite/vaterite or calcite/aragonite/vaterite).

Any suitable grade of $CO_2$ may be used depending on the desired outcome of carbonation. For example, industrial grade $CO_2$ at about 99% purity may be used, which is commercially available from a variety of different industrial gas companies, such as Praxair, Inc., Linde AG, Air Liquide, and others. The $CO_2$ supply may be held in large pressurized holding tanks in the form of liquid carbon dioxide regulated at a temperature such that it maintains a desired vapor pressure, for example, of approximately 300 PSIG. This gas is then piped to a $CO_2$ curing (carbonation) enclosure or chamber. In the simplest system, $CO_2$ is flowed through the enclosure at a controlled rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so to maintain a concentration of $CO_2$ sufficient to drive the curing reaction.

Carbon dioxide concentrations may be continuously controlled and consistently maintained. $CO_2$ concentration may be measured or monitored directly in the system, such as by NDIR, and a controller such as a PLC may be employed to control the $CO_2$ concentration at a set point with an electronic/automated control valve, for example. In the NDIR measurement method, a gas sample stream is pulled from the system via a low flow pump. A chiller is used to drop moisture out of the gas stream before it is sampled by NDIR. A measurement of the humidity in the system gas flow can be performed using a dry bulb-wet bulb psychrometric technique, using a dry bulb-wet bulb humidity measurement device or using a different type of moisture sensor. The true $CO_2$ concentration can be calculated using the computer control system or PLC. Once the true $CO_2$ concentration is known, the actuated proportioning control valve can add dry $CO_2$ into the system when it has been consumed and has gone below the set point that is desired at that time. In various embodiments, the set point can vary with time, if necessary, based on experience in curing specific compositions, shape and sizes of composite material specimens.

Figure 3:
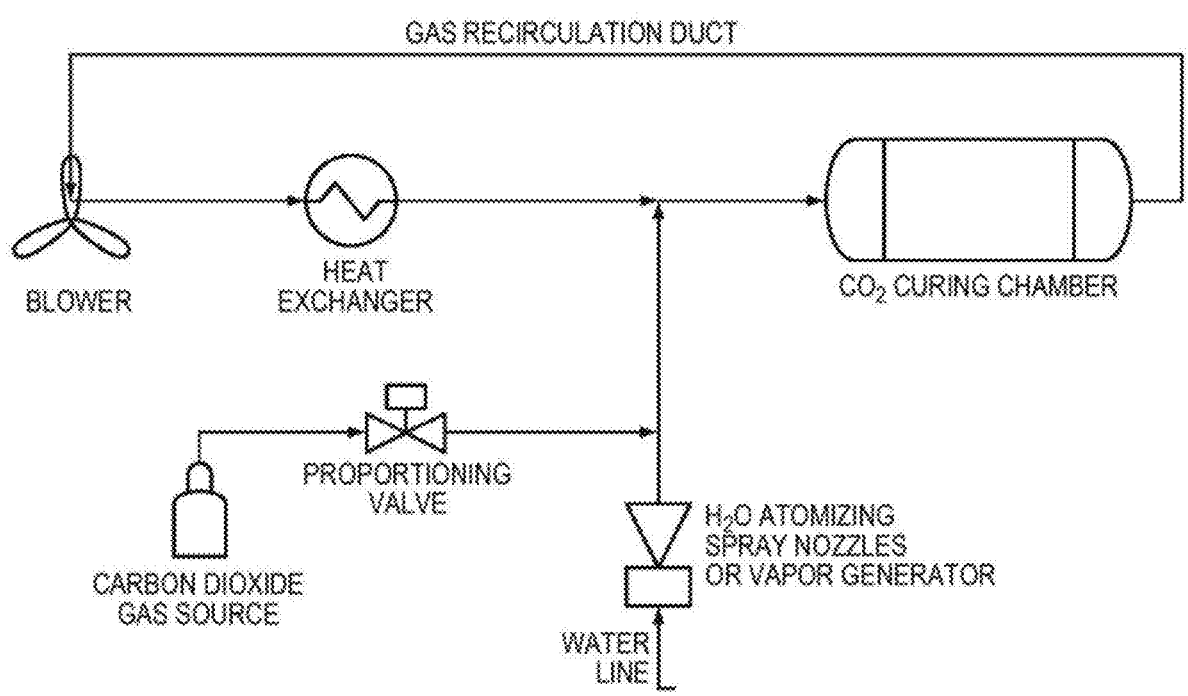
FIG. 3 is a schematic diagram of a $CO_2$ composite material curing chamber that provides humidification according to principles of the invention.

FIG. 3 is a schematic diagram of an exemplary curing chamber that provides humidification. In FIG. 3, a water supply is provided and water vapor is added to the atmosphere that is circulating within the curing chamber. The water can be any convenient source of potable water. In some embodiments, ordinary tap water is used. In some embodiments, the water can be converted to vapor by flowing through a misting nozzle or an atomizing spray nozzle, an electric vapor generator, a gas fired vapor generator, or by being heated above the gas temperature in the chamber so as to cause evaporation from a liquid water supply an example being a drum reactor with an immersion heater. In yet another embodiment, the $CO_2$ supply can be flowed into the systems after having been bubbled through a heated water supply in order to increase relative humidity of the incoming gas stream an example being a drum reactor configured for "flow through" or "open loop" processing.

Relative humidity is yet another important parameter in both traditional concrete curing as well as in $CO_2$ composite material curing. In a traditional curing chamber a moist air atmosphere exists that is comprised of mostly nitrogen, oxygen, and water vapor. In these systems relative humidity is most often measured by a standard capacitive sensor technology. However, $CO_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors can be used in the $CO_2$ composite material curing systems described herein.

Depending on the type and geometry of the product being cured, the design of the chamber, and the packing efficiency of product in the chamber the humidity may need to be either decreased or increased and regulated to a specified set point. Set points may range anywhere from 1% to 99% relative humidity. Three different methods for humidity control may exist in $CO_2$ composite material curing processes that could be combined into a single system. One method for humidification in one embodiment of a $CO_2$ curing system is represented in FIG. 3. Another method allows one to remove moisture from the system to cure the composite material products with $CO_2$. A simple method of reducing the relative humidity is by displacing the humid gas in the system with a dry gas, such as carbon dioxide. In still another embodiment, one can reduce relative humidity and therefore remove water vapor from the gas by a non-purging method, which in one preferred embodiment is a chilled heat exchanger that performs water extraction.

Figure 4:
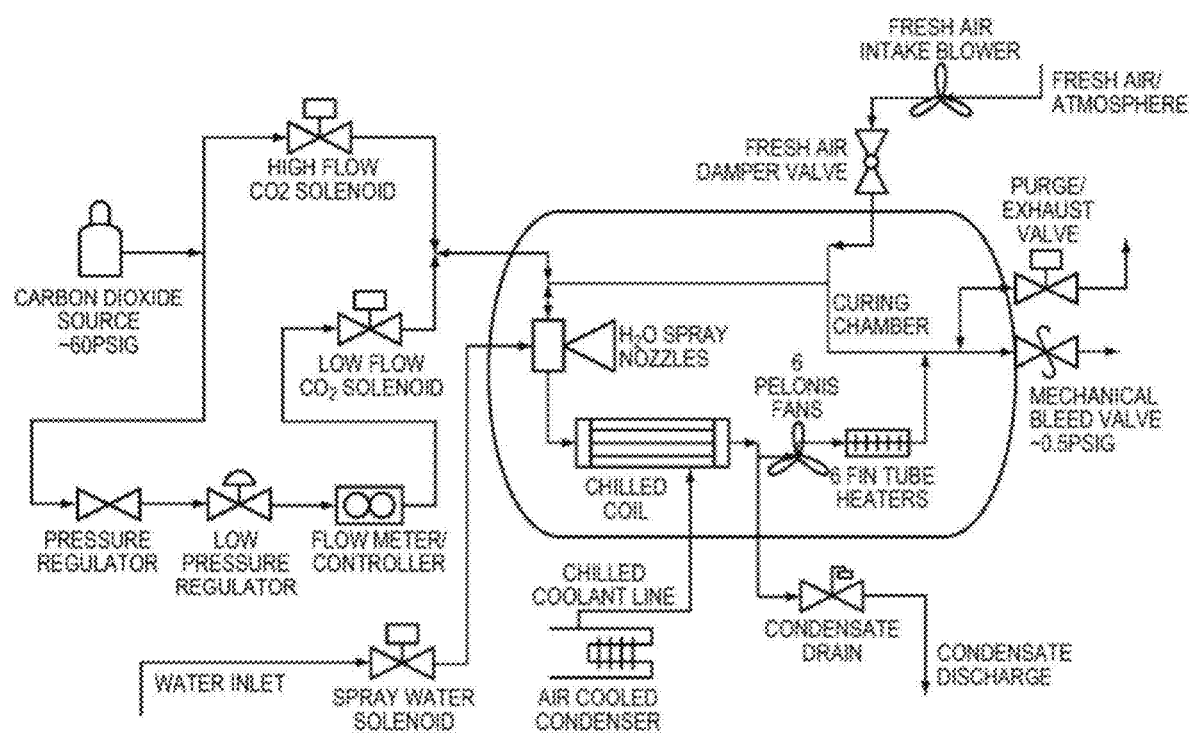
FIG. 4 is a schematic diagram of a curing chamber with multiple methods of humidity control as well as ability to control and replenish $CO_2$ using constant flow or pressure regulation and that can control the temperature according to principles of the invention.

FIG. 4 is a schematic diagram of an exemplary curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value. If deviation from the desired value is measured, corrective action is taken to bring the value of the parameter into agreement with the desired value. Such control systems can be expensive and complex, and may be useful with regard to high value products or products that require very precise process conditions.

Another control parameter is gas velocity and flow control across the material that is to be $CO_2$ cured in the system. The gas velocity can be dependent on process equipment variables including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

Temperature control is yet another important parameter in the carbonation of calcium silicate to form the desired bonding elements and composite material of the invention. Temperature may be measured using a sensor such as a thermocouple or an RTD. The measurement signal may be directed back to a controller or computer that is able to regulate energy into the heat exchanger and thereby adjust the temperature of the entire system over time. The blower is an important component of the heating system as it is able to help transfer the heat energy to the gas that transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber.

The process for preparing the composite material and bonding elements of the invention may be configured so as to achieve the particular performance parameters desired of the carbonated products. Generally, such a process includes: mixing a powdery composition (cement) and a liquid composition to create a slurry mixture; forming the slurry mixture into a desired shape, either by casting the slurry into a mold, pressing the slurry in a mold, pressing the slurry in a vibrating mold, extruding the slurry, slip forming the slurry, or using any other shape-forming method common in concrete production, and curing the formed slurry mixture at a temperature in the range from about 20° C. to about 150° C. for about 1 hour to about 80 hours under a vapor comprising water and $CO_2$ and having a pressure in the range from about ambient atmospheric pressure to about 50 psi above ambient atmospheric pressure and having a $CO_2$ concentration ranging from about 10% to about 90% to produce a composite material. Thus, curing the formed slurry mixture may be adventurously performed at a temperature in the range from about 20° C. to about 150° C. Curing may be performed for about 1 hour to about 80 hours. The pressure under which curing takes place may be from about ambient atmospheric pressure to about 50 psi above ambient atmospheric. The $CO_2$ concentration may range from about 10% to about 90%.

The time required for curing of a composite material object is determined by the ability of water vapor and $CO_2$ gas to diffuse throughout the object. In general, thicker objects take longer to cure than thinner objects. Similarly, objects with high density (and fewer open pore spaces) take longer to cure than objects with low density (and more open pore spaces). The following table provides examples of how the curing times may vary with respect to the smallest thickness (or wall thickness or section thickness) of the three dimensions and the bulk density of an object that is being manufactured.

Superior properties and performance characteristics suitable for specific applications may be obtained. In certain embodiments, the composite material is characterized by a compressive strength from about 20 MPa to about 175 MPa (e.g., about 20 MPa to about 150 MPa, about 20 MPa to about 120 MPa, about 20 MPa to about 100 MPa, about 20 MPa to about 80 MPa, about 20 MPa to about 65 MPa, about 30 MPa to about 120 MPa, about 30 MPa to about 100 MPa, about 30 MPa to about 65 MPa, about 60 MPa to about 120 MPa, about 90 MPa to about 130 MPa, about 100 MPa to about 175 MPa, about 120 MPa to about 175 MPa, about 140 MPa to about 175 MPa, about 150 MPa to about 175 MPa).

In certain embodiments, the composite material is characterized by a flexural strength from about 3 MPa to about 30 MPa (e.g., about 3 MPa to about 25 MPa, about 3 MPa to about 20 MPa, about 3 MPa to about 15 MPa, about 3 MPa to about 10 MPa, about 10 MPa to about 30 MPa, about 20 MPa to about 30 MPa, about 5 MPa to about 20 MPa).

In certain embodiments, the composite material is characterized by water absorption of less than about 10%. In some other embodiments, the composite material is characterized by water absorption of less than about 8%. In some other embodiments the composite material is characterized by water absorption of less than about 5%. In some other embodiments the composite material is characterized by water absorption of less than about 4%. In some other embodiments the composite material is characterized by water absorption of less than about 3%. In some other embodiments the composite material is characterized by water absorption of less than about 2%. In some other embodiments the composite material is characterized Bywater absorption of less than about 1%.

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

Products and Applications of Composite Materials

The composite material and bonding elements disclosed herein can be used in a variety of applications due to their superior properties, which may be fine tuned as needed as described herein, in infrastructures, constructions, pavement, landscaping industries, energy storage, energy generation, agricultural, automotive, abrasive and cutting applications, etc.

The composite material and bonding elements disclosed herein can be applied in many applications of Portland cement, lime cement or related cementitious materials. The composite material of the invention can be used in any applications wherein conventional structural or regular concrete are employed, e.g., dams, bridges, swimming pools, homes, streets, patios, basements, balustrades, plain cement tiles, mosaic tiles, pavement blocks, lamp-posts, drain covers, or combinations thereof.

Various additives can be used to modify and fine-tune the physical appearance and/or mechanical properties of the resulting composite material, such as additives selected from one or more of pigments, colored glass and/or colored quartz. Additives regarding water usage reduction and changes in rheology can also be used.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide) The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

In certain embodiments, the bonding element/matrix is blended with fibers, sand, aggregates, and/or other additives, such as defoamers and/or ultrafine particles, such as fumed silica and $CaCO_3$, to prepare fiber reinforced concrete (FRC) which performs like Fiber reinforced composites and/or Ultra High Performance Concrete (UHPC). These solids can be used in any applications, in which conventional FRC and/or UHPC is employed. In an alternative embodiment, by controlling the fluidity (e.g., by tailoring the water content during processing), other installation types of concrete products can be produced. The products included Shotcrete, Self Compacting Concretes, Roller Compacted Concretes, or combinations thereof.

In another embodiment, the bonding element/matrix is blended with a metal such as aluminum and $Ca(OH)_2$ and autoclaved, or by controlling porosity by using different aids like vacuum, or air entrainment to produce a material that mimics/resembles Autoclave Aerated Concrete (AAC). This material can be used in any applications in which conventional AAC is employed.

In certain embodiments, the bonding element/matrix is blended with sand and/or low density aggregates (e.g., density<2.0 g/cm3, for example expanded vermiculite and perlite, pumice, expanded slag, expanded shale, or combinations thereof), and by controlling porosity, these composites can be used as light-weight concretes or Cellular concrete, light-weight aerated concrete, variable-density concrete, foamed concrete or ultra light-weight concretes or any other material related to these types of concretes. In another embodiment, the bonding element/matrix is blended with high density aggregates (e.g., density>3.2 $g/cm^3$), and the resultant product can be heavy-weight concretes.

The presently described bonding element/matrix can be used in combination (and thus reinforced) with steel or other metal reinforcement materials to make reinforced concrete products, which can be used in any applications in which reinforced conventional concrete structures are employed. The material can be pre-stressed to mimic/resemble Pre-stressed Concrete. In certain embodiments, the bonding element/matrix can be poured in huge blocks to produce a material that mimics/resembles mass concrete. Applications for such mass-concrete types of material can include gravity dams, large breakwaters, or a combination thereof. The concrete derived from the presently described bonding element and bonding matrix can also be fabricated with different textures for decorative or functional purposes.

In some embodiments, the composite material of the invention may be prepared such that it may exhibit excellent corrosion resistance, such as providing protection to steel reinforcement in an environment with high chloride content, and excellent durability in aggressive sulphate environments. A composite material can be used in highly specialized applications, such as sound shielding and/or or nuclear radiation shielding. In one embodiment, the material can have desirable fire resistance, and can be suitable for refractory applications. The material can also withstand extreme weather conditions, such as, for example, freezing conditions, high temperatures in deserts, or extreme weather fluctuations, and/or freeze-thaw resistance. The material can also be suitable for use in specialized marine, cryogenic, and/or blast resistance applications. In some embodiments, the material can be used in earthquake resistant structures and/or geosynthetic type structures.

The bonding elements of the invention can be blended with additives, including $CaCO_3$, or gypsum, and sand, to form monolithic solids. The bonding elements of the invention can also be blended with sand, or other minerals to prepare mortar or grout, and the resultant material can be used in any applications wherein conventional mortar and grout are employed. The bonding elements of the invention may be blended with metallic, or organic, or ceramic fibers to make a fiber cement. The resultant material can be used in any applications wherein conventional fiber cements are employed.

Any suitable aggregates may be used to form composite materials from the carbonatable composition of the invention, for example, calcium oxide-containing or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the composite material; for example, plasticizers, superplasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "forsterite") and $Mg_3Si_4O_{10}(OH)_2$ (also known as "talc"), which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

EXAMPLES

Samples of carbonatable calcium silicate cements were embedded in epoxy, polished and coated with carbon to obtain information on the distribution of phases within individual particles. The samples were analyzed by scanning electron microscopy (SEM) in backscattered electron (BSE) imaging mode. The contrast of each phase is related to that phase's stoichiometry, where more dense phases containing high mean atomic number elements will appear more brightly than a less dense phase with a lower mean atomic number. The contrast of the various phases can be related by comparison of the BSE contrast factor η calculated using the mean atomic number Z of each phase.

$$\eta = \frac{\ln \overline{Z}}{6} - \frac{1}{4} (\overline{Z} \geq 10) \quad \text{(Equation 1)}$$

The average atomic number $\overline{Z}$ of each phase is the sum of atomic masses of each atom present in the phase divided by the total number of atoms where N is the number of each element of atomic number A and atomic mass Z (ΣNA is the molecular weight).

$$\overline{Z} = \frac{\Sigma NAZ}{\Sigma NA} \quad \text{(Equation 2)}$$

The η for the phases present in the cement particles are show in Table 1. Amorphous phases have a variable chemistry not determined by diffraction. For most cements, the amorphous phase will have a composition similar to the melilite phase. In cements with lower $Al_2O_3$ and MgO content the amorphous phase will have a higher mean atomic number and thus will exhibit a higher brightness in BSE imaging. Phase identities are verified by x-ray microprobe measurement of individual phases.

TABLE 1

Calculated BSE contrast values for the phases present in carbonatable calcium silicate cement particles [a]

| Phase | η |
|---|---|
| $SiO_2$ | 0.127 |
| $CaCO_3$ | 0.148 |
| Al-Melilite ($Ca_2Al_2SiO_7$) | 0.154 |
| Mg-Melilite ($Ca_2MgSi_2O_7$) | 0.154 |
| Wollastonite ($CaSiO_3$) | 0.160 |
| Rankinite ($Ca_3Si_2O_7$) | 0.166 |
| Belite ($Ca_2SiO_4$) | 0.171 |

[a] The highest value will correspond to the phase with the highest brightness. The calcium silicate phases have the highest BSE contrast and will be the brightest phases in a BSE image. The darkest areas in an image correspond to pores or voids filled with the carbon based mounting resin.

Figure 5:
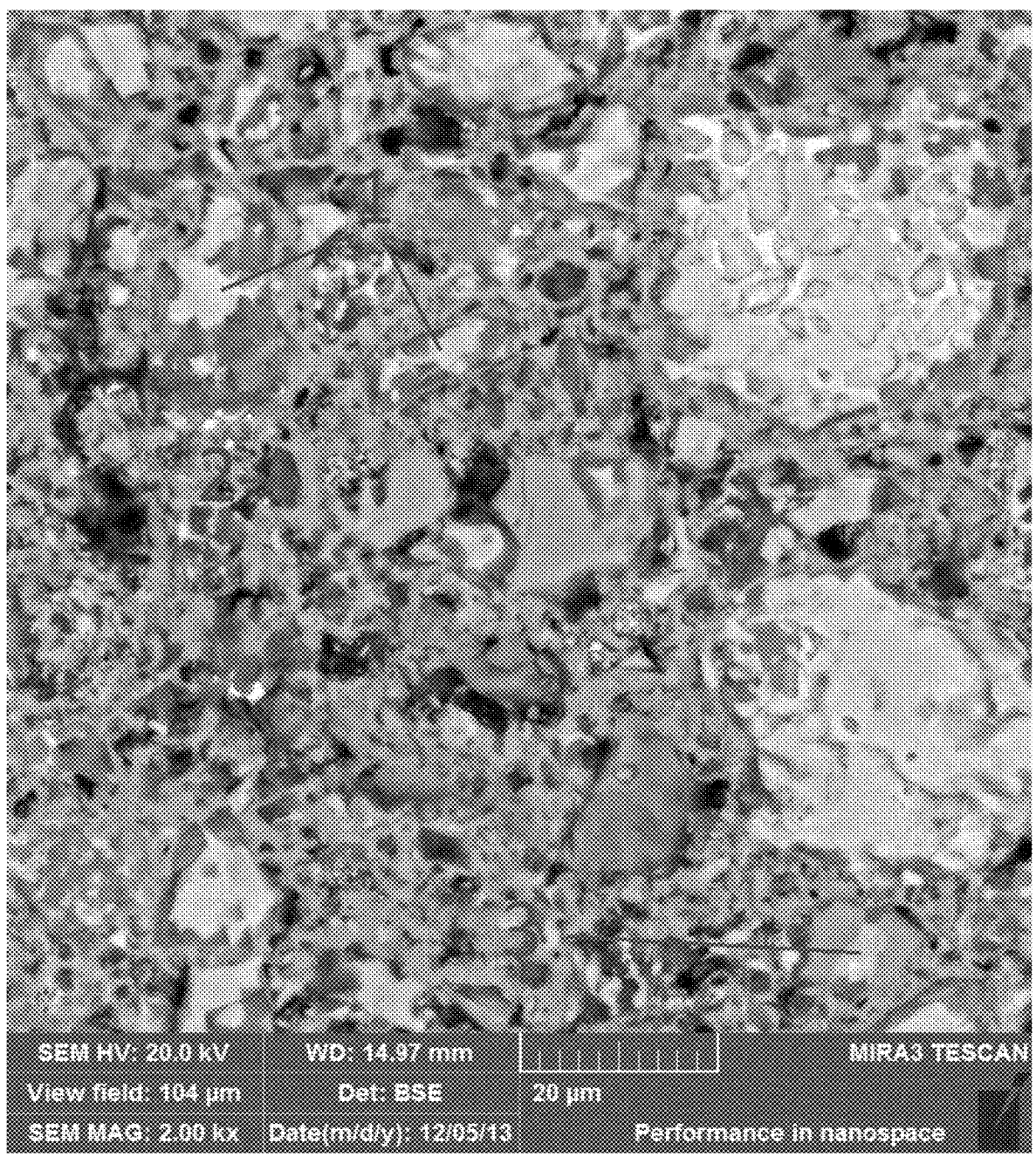
FIG. 5. A backscattered electron (BSE) image of reacted cement particles. The image displays high brightness reactive phase core particles with a silica rim of variable thickness and encased in $CaCO_3$ (1). An inert phase particle completely encased in $CaCO_3$ is also visible (2). A multi-phase core composed of high brightness reactive phases and medium brightness amorphous phase with a silica rim and particle $CaCO_3$ is also visible (3).

Experimental cements produced in three separate processes with distinct end chemistries were produced. Experimental Cement 1 was produced with limestone and sand ground to fineness of 85% passing 200 mesh. The limestone and sand were blended to obtain a bulk calcium to silicon atomic ratio of approximately 1. The ground and blended raw material was processed in a rotary kiln to a peak temperature of approximately 1200° C. with a residence time of 30 to 60 minutes to react the powder and produce nodules of a sintered carbonatable calcium silicate cement clinker largely composed of carbonatable calcium silicates, melilites, an amorphous phase with a melilite-like composition and unreacted silica. The oxide composition of this cement as determined by X-Ray fluorescence (XRF) is shown in Table 2. The phase composition of this cement as determined by X-Ray diffraction (XRD) is shown in Table 3. The cement clinker was then ground using a two-compartment closed circuit ball mill. The material feed rate, ball mill rotation rate and pneumatic separator airflow were controlled to produce a ground cement with a mean particle diameter of 12 nm. FIG. 5 shows a compact of reacted particles produced using this cement and exposing to a >95% $CO_2$ atmosphere at 60° C. for 18 hours.

Figure 6:
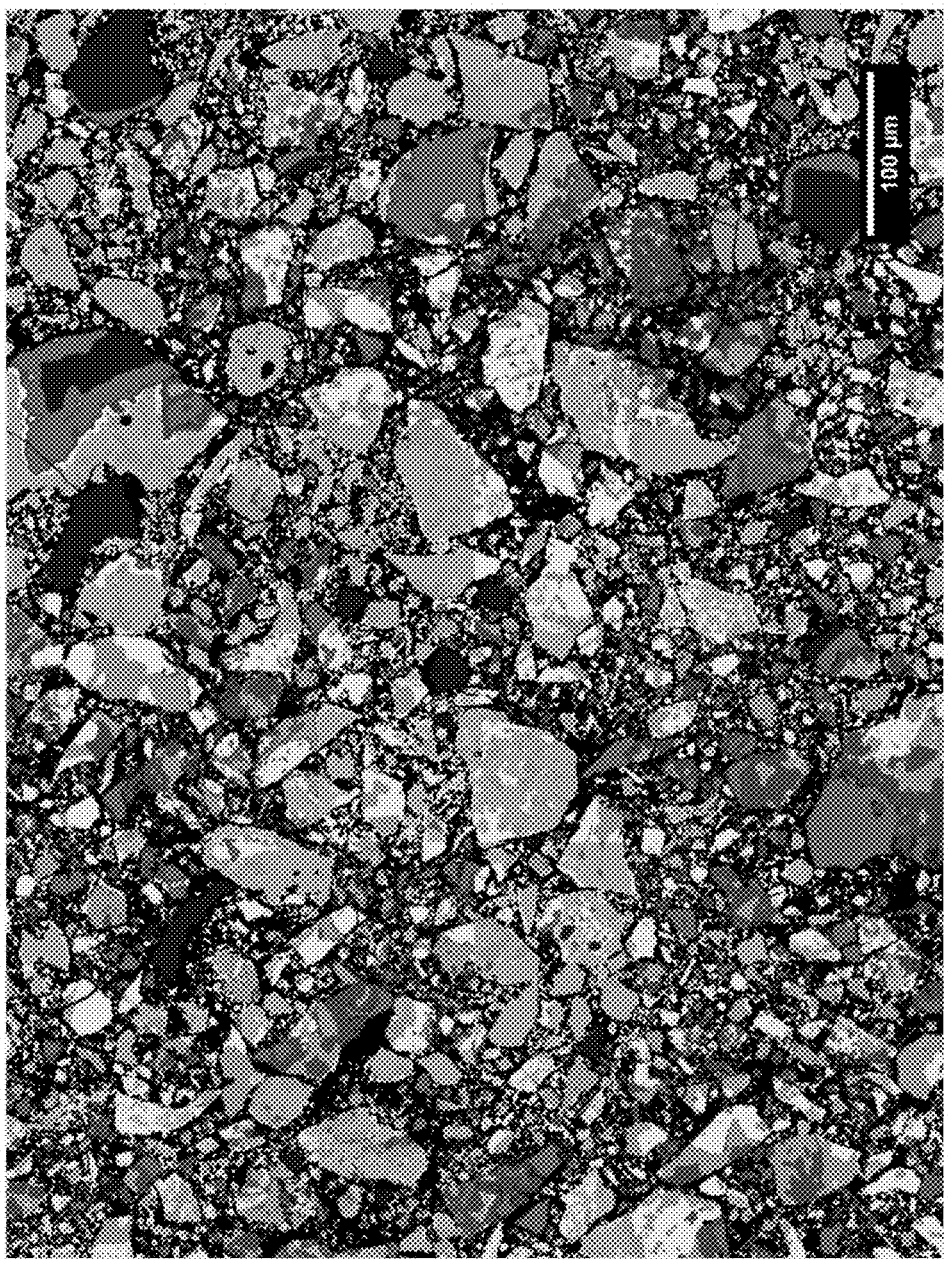
FIG. 6. False color composite micrograph depicting various particles of experimental cement 1. Single and multi-phase particles of many compositions are visible.
Figure 6:
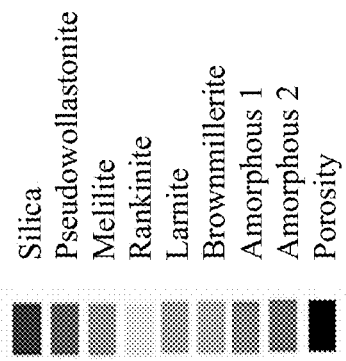
Figure 7:
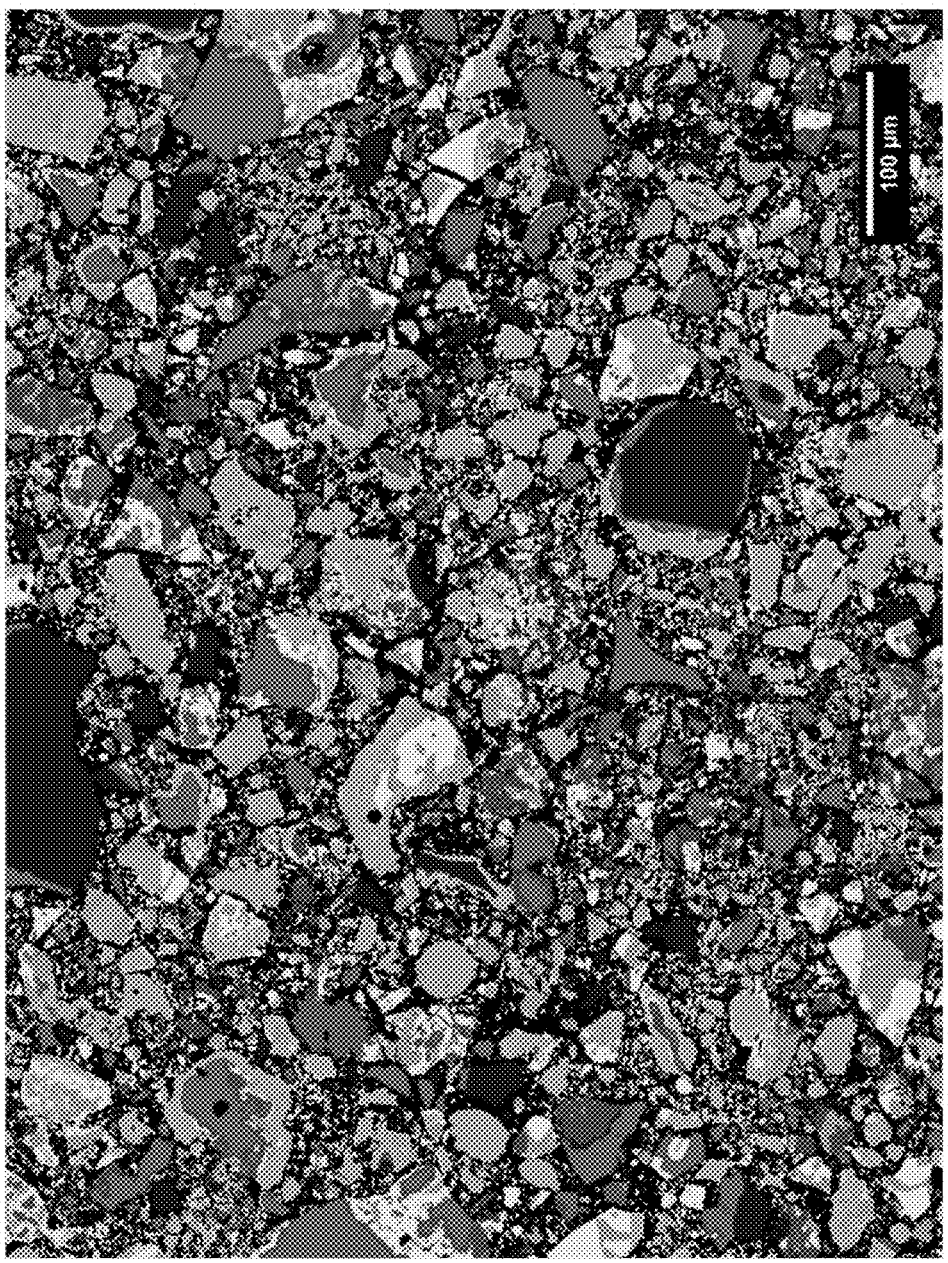
FIG. 7. False color composite micrograph depicting various particles of experimental cement 1. Single and multi-phase particles of many compositions are visible.
Figure 7:
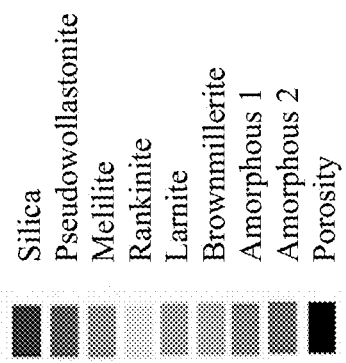
Figure 8:
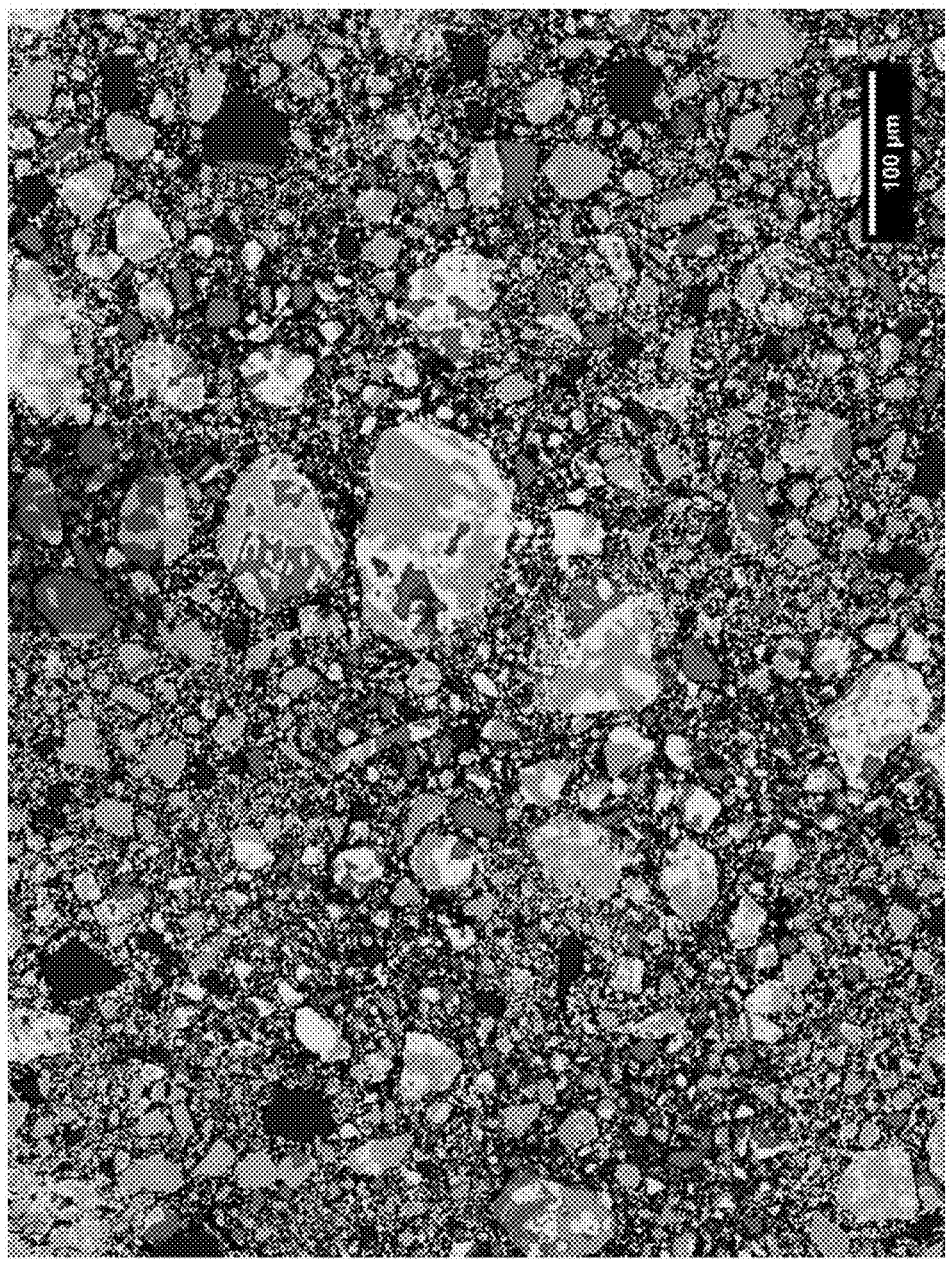
FIG. 8. False color composite micrograph depicting various particles of experimental cement 1. Single and multi-phase particles of many compositions are visible.
Figure 8:
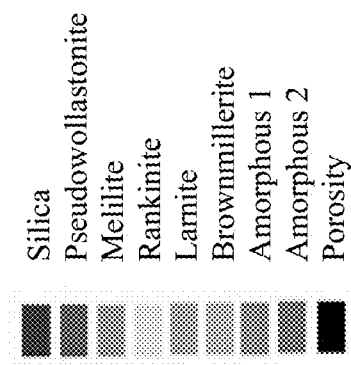

Experimental Cement 1 was subjected to a detailed survey by SEM in BSE mode in conjunction with X-Ray microprobe analysis. The elemental composition as measured by X-Ray microprobe was associated with the phases identified by XRD. The atomic composition of the phases as determined by X-Ray microprobe is shown in Table 4. This analysis identified an additional phase, brownmillerite or $Ca_2(Al,Fe)_2O_5$ as well as two distinct partially reactive amorphous phases: A low Al content amorphous phase, Phase 1, and a high Al content amorphous phase, Phase 2. In FIG. 6, FIG. 7, and FIG. 8 the compositional data collected in conjunction with the contrast of the phases as seen in BSE images was used to construct false-color maps of the unreacted particles. Numerous examples of multiphase particles of various classifications are observed.

TABLE 2

Oxide composition of Experimental Cement 1 as measured by XRF

| SiO$_2$ | CaO | Al$_2$O$_3$ | Fe$_2$O$_3$ | MgO | SO$_3$ | K$_2$O | Na$_2$O | TiO$_2$ | P$_2$O$_5$ | Mn$_2$O$_3$ |
|---|---|---|---|---|---|---|---|---|---|---|
| 44.9% | 43.8% | 5.3% | 1.8% | 1.2% | 0.3% | 2.0% | 0.4% | 0.2% | 0.1% | 0.0% |

TABLE 3

Phase composition of Experimental Cement 1 as measured by XRD

| Wollastonite CasiO$_3$ | Rankinite Ca$_3$Si$_2$O$_7$ | Belite Ca$_2$SiO$_4$ | Amorphous variable | Silica SiO$_2$ | Lime CaO | Melilites variable |
|---|---|---|---|---|---|---|
| 15% | 19% | 14% | 30% | 5% | 1% | 16% |

TABLE 6

Phase composition of Experimental Cement 2 as measured by XRD

| Wollastonite CasiO$_3$ | Rankinite Ca$_3$Si$_2$O$_7$ | Belite Ca$_2$SiO$_4$ | Amorphous variable | Silica SiO$_2$ | Lime CaO | Melilites variable |
|---|---|---|---|---|---|---|
| 20% | 0% | 11% | 68% | 1% | 0% | 0% |

TABLE 4

Atomic composition of phases in Experimental Cement 1 determined by X-Ray microprobe analysis. (Expressed as atomic %)

| Phase | O | Na | Mg | Al | Si | S | K | Ca | Ti | Mn | Fe |
|---|---|---|---|---|---|---|---|---|---|---|---|
| Wollastonite/Pseudowollastonite | 59.5 | 0.0 | 0.0 | 0.6 | 18.7 | 0.0 | 0.3 | 20.8 | 0.1 | 0.0 | 0.1 |
| Rankinite | 58.0 | 0.0 | 0.2 | 0.4 | 15.8 | 0.0 | 0.1 | 25.5 | 0.0 | 0.0 | 0.0 |
| Belite | 56.8 | 0.0 | 0.1 | 0.6 | 13.3 | 0.0 | 0.2 | 28.8 | 0.0 | 0.0 | 0.1 |
| Amorphous (1) | 62.2 | 0.7 | 0.8 | 0.7 | 36.1 | 0.0 | 4.2 | 4.7 | 0.1 | 0.0 | 0.4 |
| Amorphous (2) | 60.0 | 0.8 | 0.4 | 9.3 | 18.8 | 0.0 | 6.3 | 4.1 | 0.0 | 0.0 | 0.1 |
| Brownmillerite | 55.9 | 0.0 | 0.7 | 7.0 | 3.3 | 0.4 | 0.3 | 23.9 | 0.4 | 0.1 | 8.0 |
| Melilite | 58.3 | 0.4 | 2.1 | 8.8 | 12.1 | 0.0 | 0.3 | 17.2 | 0 | 0 | 0.8 |
| Silica | 66.6 | 0.0 | 0.0 | 0.3 | 33.0 | 0.0 | 0.0 | 0.0 | 0.0 | 0.0 | 0.0 |
| Lime | 50.0 | 0.0 | 0.0 | 0.0 | 0.0 | 0.0 | 0.0 | 50.0 | 0.0 | 0.0 | 0.0 |

Figure 9:
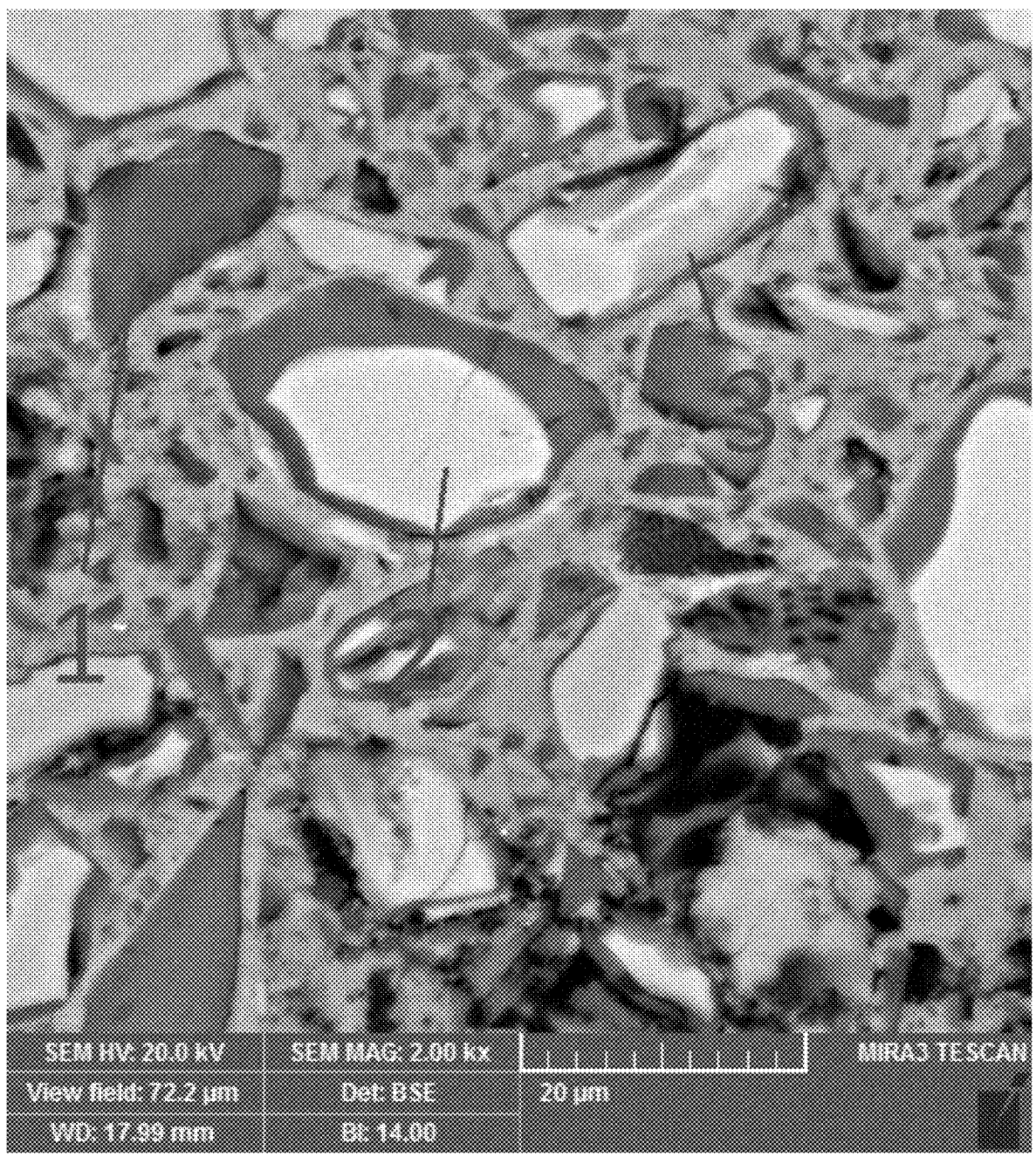
FIG. 9. A backscattered electron (BSE) image of reacted cement particles. The image displays a low brightness $SiO_2$ rich core particle encased by a $CaCO_3$ (1). Another particle displays a high brightness reactive phase core surrounded by a low contrast $SiO_2$ rim and fully encased by $CaCO_3$ (2). Another particle displays a multiphase core comprised of intermixed high contrast reactive and medium contrast amorphous phase. The core particle is surrounded on some surfaces by a low contrast $SiO_2$ rim and is partially encased by $CaCO_3$ (3).
Figure 10:
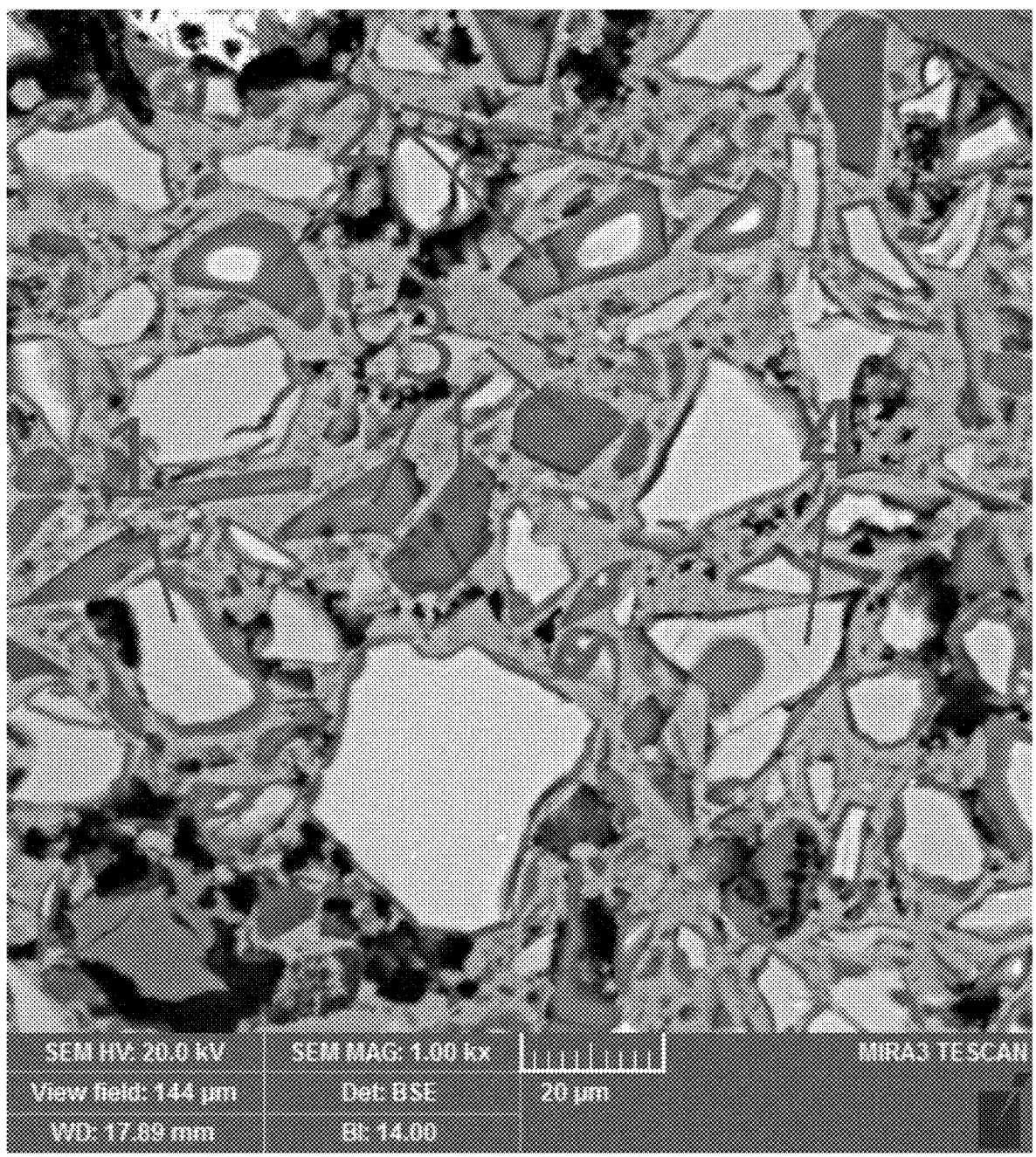
FIG. 10. A backscattered electron (BSE) image of reacted cement particles. The image displays a high brightness reactive particle surrounded by a silica rim of varying thickness (1). The particle is encased by $CaCO_3$ where the silica rim is visible. Several high brightness particles show a thick silica rim evident of a high degree of reaction (2). The particles would appear as inert cores encased by $CaCO_3$ if fully reacted (3). A multiphase particle composed of a high brightness reactive phases phase and a low brightness $SiO_2$ phase is shown (4). The reactive portion of the particle has a silica rim and the core particle is partially encased by $CaCO_3$.

In Experimental Cement 2, high purity limestone and sand were ground and blended to achieve a bulk calcium to silicon atomic ratio of approximately 1. The ground and blended raw material was granulated by agitation with water and loaded into refractory vessels. The vessels and granulated raw material were fired to 1500° C. in an electric furnace to produce a sintered carbonatable calcium silicate cement clinker largely composed of reactive calcium silicates, an amorphous phase with a wollastonite-like composition and unreacted silica. The oxide composition of this cement as determined by X-Ray fluorescence (XRF) is shown in Table 5. The phase composition of this cement is shown in Table 6. The resultant raw material was ground by jet milling. The material feed rate, mill geometry, and air pressure were controlled to achieve a mean particle of 12 µm. Compacts of the ground cement were reacted by exposing them to a >95% CO$_2$ atmosphere at 60° C. for 18 hours. FIG. 9 and FIG. 10 show reacted single and multiphase particles.

A carbonatable calcium silicate was produced (Experimental Cement 3). To obtain the cement limestone and sand were ground to fineness of 85% passing 200 mesh. The limestone and sand were blended to obtain a bulk calcium to silicon atomic ratio of 1. The ground and blended raw material was processed in a rotary kiln to a peak temperature of approximately 1260° C. with a residence time of 30 to 60 minutes to react the powder and produce nodules of a sintered carbonatable calcium silicate cement clinker largely composed of carbonatable calcium silicates, melilites, an amorphous phase with a melilite-like composition and unreacted silica.

Figure 11:
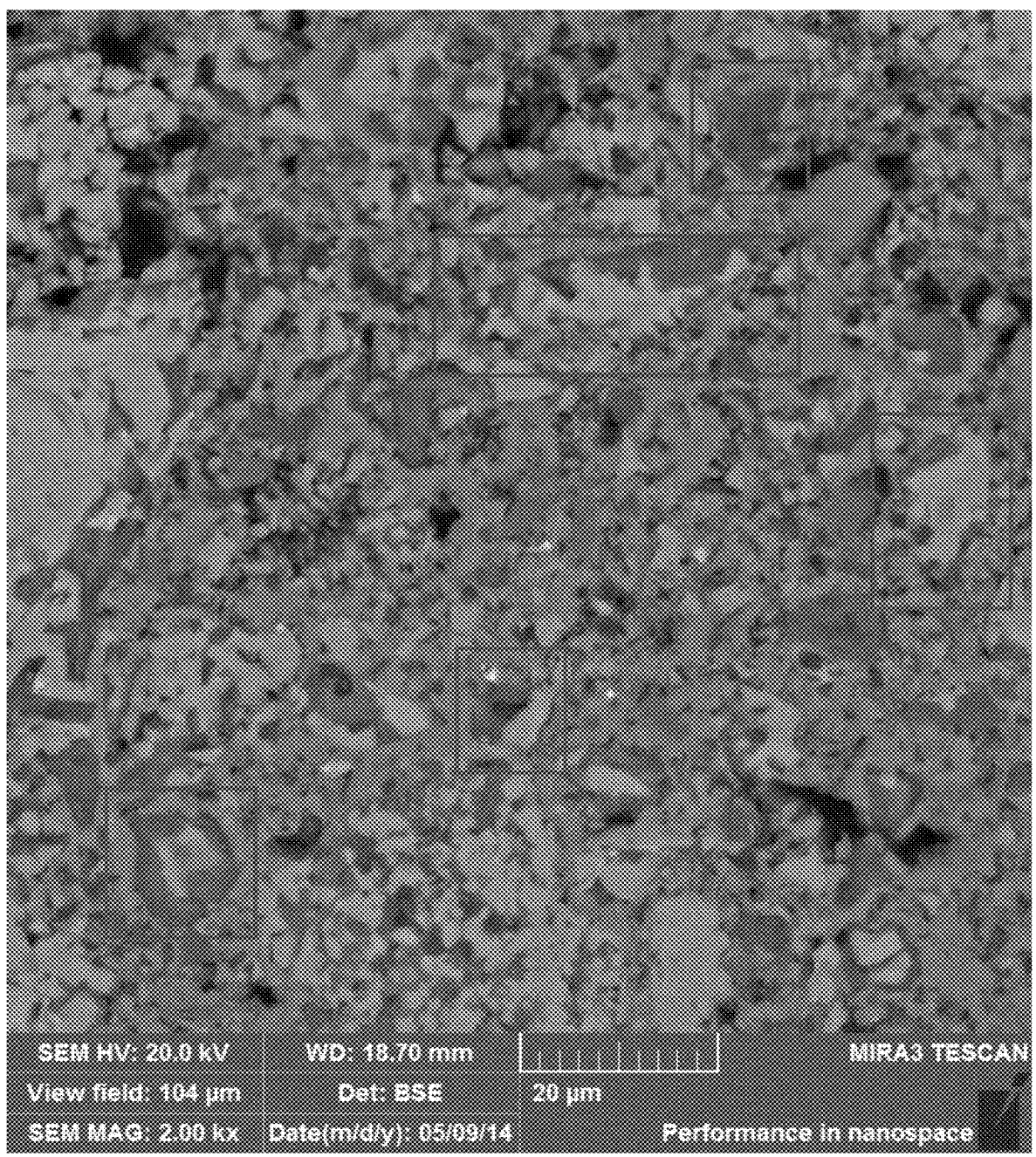
FIG. 11. A backscattered electron (BSE) image of a dense reacted cement paste. The image displays a number of exemplary core-shell structures created by the reaction of multi-phase cement particles.
Figure 12:
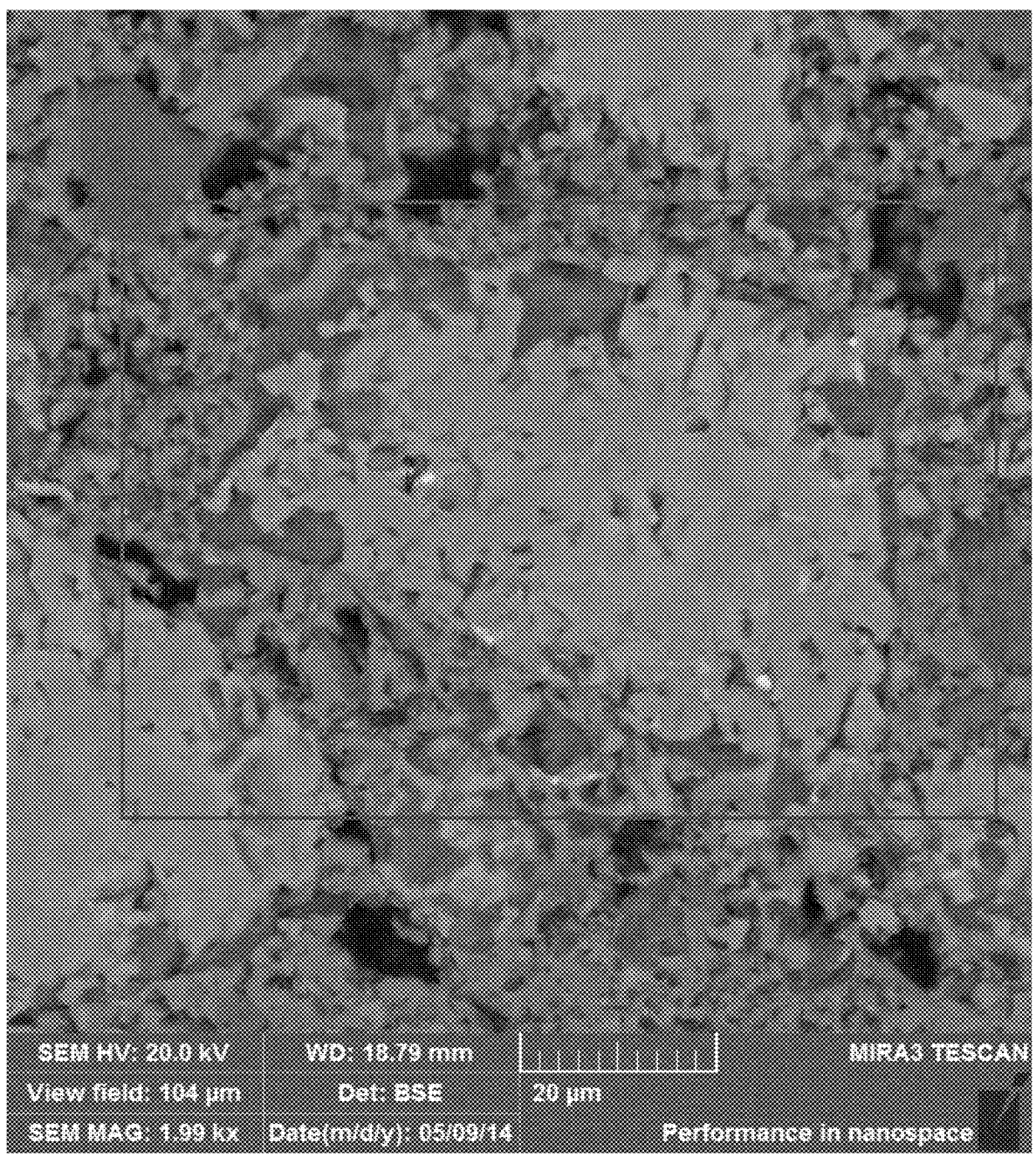
FIG. 12. A backscattered electron (BSE) image of a dense reacted cement paste. The image shows a large multi-phase particle with silica rich regions suggestive of a reactive—void particle.

The oxide composition of this cement as determined by XRF is shown in Table 7. The phase composition of this cement as measured by XRD is shown in Table 8. The cement clinker was then ground using a two compartment closed circuit ball mill. The material feed rate, ball mill rotation rate and pneumatic separator airflow were controlled to produce a ground cement with a mean particle diameter of 12 µm. FIG. 11 and FIG. 12 show compacts of reacted particles produced using this cement and exposing to a >95% CO$_2$ atmosphere at 60° C. for 18 hours.

TABLE 5

Oxide composition of Experimental Cement 2 as measured by XRF

| SiO$_2$ | CaO | Al$_2$O$_3$ | Fe$_2$O$_3$ | MgO | SO$_3$ | K$_2$O | Na$_2$O | TiO$_2$ | P$_2$O$_5$ | Mn$_2$O$_3$ |
|---|---|---|---|---|---|---|---|---|---|---|
| 45.8% | 51.1% | 1.8% | 0.4% | 0.6% | 0.3% | 0.3% | 0.0% | 0.0% | 0.0% | 0.0% |

TABLE 7

Oxide composition of Experimental Cement 3 as measured by XRF

| SiO$_2$ | CaO | Al$_2$O$_3$ | Fe$_2$O$_3$ | MgO | SO$_3$ | K$_2$O | Na$_2$O | TiO$_2$ | P$_2$O$_5$ | Mn$_2$O$_3$ |
|---|---|---|---|---|---|---|---|---|---|---|
| 43.8% | 42.9% | 6.0% | 2.5% | 2.0% | 1.0% | 1.1% | 0.1% | 0.3% | 0.2% | 0.1% |

TABLE 8

Phase composition of Experimental Cement 3 as measured by XRD

| Wollastonite CaSiO$_3$ | Rankinite Ca$_3$Si$_2$O$_7$ | Belite Ca$_2$SiO$_4$ | Amorphous variable | Silica SiO$_2$ | Lime CaO | Melilites variable |
|---|---|---|---|---|---|---|
| 23% | 18% | 1% | 23% | 5% | 0% | 30% |

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples included herein and the references to the scientific and patent literature cited herein. These examples contain important additional information, exemplification and guidance that can be adapted to the practice of this invention in its various embodiments and equivalents thereof.

What is claimed is:

1. A composite material produced by carbonation of calcium silicate with CO$_2$ comprising a plurality of bonding elements,
    said bonding elements comprising a multi-phase core comprised of intermixed silica and calcium silicate, which multi-phase core is fully or partially surrounded by a silica rich rim of varying thickness that is fully or partially encased by CaCO$_3$ particles;
    wherein the silica rich rim has a thickness ranging from about 0.01 μm to about 50 μm and is characterized by a silica content ranging from about 50% to about 90% by volume and a CaCO$_3$ content ranging from about 10% to about 50% by volume.

2. The composite material of claim 1, wherein the calcium silicate is selected from wollastonite, pseudowollastonite, rankinite, belite, and carbonatable amorphous calcium silicates, or a combination of two or more thereof.

3. The composite material of claim 1, further comprising one or more voids spatially disposed between bonding elements.

4. The composite material of claim 1, further comprising one or more filler materials.

5. The composite material of claim 4, wherein the one or more filler materials are uniformly distributed in the bonding matrix.

6. The composite material of claim 1, further comprising one or more supplementary materials selected from fly ash, slag and silica fume.

7. A bonding matrix comprising a plurality of bonding elements, wherein the bonding elements comprise
    a multi-phase core comprised of intermixed silica and calcium silicate, which multi-phase core is fully or partially surrounded by a silica rich rim of varying thickness that is fully or partially encased by CaCO$_3$ particles;
    wherein the silica rich rim has a thickness ranging from about 0.01 μm to about 50 μm and is characterized by a silica content ranging from about 50% to about 90% by volume and a CaCO$_3$ content ranging from about 10% to about 50% by volume.

8. The bonding matrix of claim 7, wherein the calcium silicate is selected from wollastonite, pseudowollastonite, rankinite, belite, and carbonatable amorphous calcium silicates, or a combination of two or more thereof.

9. The bonding matrix of claim 7, further comprising one or more voids spatially disposed between bonding elements.

10. The composite of claim 7, wherein the silica and the calcium silicate are intermixed at a central region.

11. The composite material of claim 1, wherein the silica and the calcium silicate are intermixed at a central region of the core.

* * * * *